United States Patent
Surek

(10) Patent No.: US 9,479,248 B2
(45) Date of Patent: Oct. 25, 2016

(54) FAULT LOCALIZATION USING TANDEM CONNECTION MONITORS IN OPTICAL TRANSPORT NETWORK

(71) Applicant: Steven Arvo Surek, Leonardo, NJ (US)

(72) Inventor: Steven Arvo Surek, Leonardo, NJ (US)

(73) Assignee: Ciena Corporation, Hanover, MD (US)

( * ) Notice: Subject to any disclaimer, the term of this patent is extended or adjusted under 35 U.S.C. 154(b) by 479 days.

(21) Appl. No.: 13/716,425

(22) Filed: Dec. 17, 2012

(65) Prior Publication Data

US 2014/0169783 A1 Jun. 19, 2014

(51) Int. Cl.
- H04B 10/079 (2013.01)
- H04Q 11/00 (2006.01)
- H04J 3/14 (2006.01)
- H04J 3/16 (2006.01)

(52) U.S. Cl.
CPC ............ *H04B 10/0791* (2013.01); *H04J 3/14* (2013.01); *H04Q 11/0062* (2013.01); *H04J 3/1652* (2013.01); *H04J 2203/006* (2013.01); *H04J 2203/0051* (2013.01); *H04Q 2011/0081* (2013.01)

(58) Field of Classification Search
None
See application file for complete search history.

(56) References Cited

U.S. PATENT DOCUMENTS

| | | | |
|---|---|---|---|
| 6,973,602 B1 | 12/2005 | Fung et al. | |
| 7,143,161 B2 | 11/2006 | Brissette | |
| 7,688,717 B2 | 3/2010 | Huck et al. | |
| 7,760,620 B2 | 7/2010 | Yan | |
| 7,889,989 B2 | 2/2011 | Zhang | |
| 2003/0115307 A1* | 6/2003 | Brissette | H04L 12/2602 709/223 |
| 2003/0231638 A1* | 12/2003 | Huck | H04J 3/14 370/400 |
| 2008/0134003 A1* | 6/2008 | Chun | H04L 1/0061 714/758 |
| 2008/0212961 A1* | 9/2008 | Zhang | G06F 15/161 398/25 |
| 2012/0219284 A1 | 8/2012 | Nian | |

FOREIGN PATENT DOCUMENTS

WO  2004027580 A2  4/2004

OTHER PUBLICATIONS

ITU—International Telecommunication Union; "G.709.1331—Series G: Transmission Systems and Media, Digital Systems and Networks"; Digital terminal equipments—General; Series Y: Global Information—Infrastructure, Internet Protocol Aspects and Next-Generation Networks; Internet protocol aspects—Transport Recommendation ITU-T G.709/Y.1331—Feb. 2012.

(Continued)

*Primary Examiner* — Adnan Baig
(74) *Attorney, Agent, or Firm* — Clements Bernard PLLC; Christopher L. Bernard; Lawrence A. Baratta, Jr.

(57) ABSTRACT

An Optical Transport Network (OTN) fault localization method, an iterative OTN fault localization method, and an OTN network use OTN tandem connection monitors operating in a "Monitor" mode to provide fault localization. The methods and network use TCMs for fault localization that can be performed manually or automatically to isolate a fault in a multi-domain OTN network to a particular link, switching fabric, or transport function. Additionally, a roles-based assignment scheme is presented for automatically assigning TCM levels between domains and links in multi-domain OTN networks. The fault localization methods enable fault localization in an automated and non-intrusive manner.

15 Claims, 13 Drawing Sheets

(56) References Cited

OTHER PUBLICATIONS

ITU—International Telecommunication Union; G.798—Series G: Transmission Systems and Media, Digital Systems and Networks—Digital terminal equipments—Other terminal equipment; Characteristics of optical transport network hierarchy equipment functional blocks; Recommendation ITU-T G.798—Oct. 2010.

ITU—International Telecommunication Union; Series G: Transmission Systems and Media, Digital Systems and Networks—Digital terminal equipments—Other terminal equipment; Types and characteristics of optical transport network equipment; Recommendation ITU-T G.798.1—Apr. 2011.

ITU—International Telecommunication Union; Series G: Transmission Systems and Media, Digital Systems and Networks—Digital networks—General aspects; Generic functional architecture of transport networks; ITU-T Recommendation G.805—Mar. 2000 Formerly CCITT Recommendation.

ITU—International Telecommunication Union; Series G: Transmission Systems and Media, Digital Systems and Networks; Architecture of optical transport networks; ITU-T G.872—Oct. 2012.

ITU—International Telecommunication Union; Series G: Transmission Systems and Media, Digital Systems and Networks—Digital networks—Optical transport networks; Optical Transport Network (OTN): Linear protection; Recommendation ITU-T G.873.1—Jul. 2011.

ITU—International Telecommunication Union; Series G: Transmission Systems and Media, Digital Systems and Networks; Digital networks—Optical transport networks; ODUk Shared Ring Protection (SRP); ITU-T G.873.2—Apr. 2012.

ITU—International Telecommunication Union; Series G: Transmission Systems and Media, Digital Systems and Networks—Data over Transport—Generic aspects—Transport network control aspects; Series Y: Global Information Infrastructure, Internet Protocol Aspects and Next-General Networks; Internet protocol aspects—Operation, administration and maintenance; Common equipment management function requirements; Amendment 1: Required specification of severely errored second to align with Recommendation ITU-T Y.1563; Jul. 2010.

ITU—International Telecommunication Union; Series G: Transmission Systems and Media, Digital Systems and Networks; Digital terminal equipments—Operations, administration and maintenance features of transmission equipment; Series Y: Global Information Infrastructure and Internet Protocol Aspects; Protocol for automatic discovery in SDH ad OTN networks; ITU-T Recommendation G.7714.1 1Y.1705.1—Apr. 2003.

* cited by examiner

FAULT LOCALIZATION USING TANDEM CONNECTION MONITORS IN OPTICAL TRANSPORT NETWORK

FIELD OF THE DISCLOSURE

The present disclosure relates generally to optical networking systems and methods. More particularly, the present disclosure relates to fault localization using Tandem Connection Monitors (TCMs) in Optical Transport Network (OTN).

BACKGROUND OF THE DISCLOSURE

Optical Transport Network (OTN) includes a set of Optical Network Elements (ONE) connected by optical fiber links, able to provide functionality of transport, multiplexing, switching, management, supervision and survivability of optical channels carrying client signals. OTN is defined, inter alia, in ITU-T Recommendations G.709 (December 2012) "Interfaces for the Optical Transport Network (OTN)," G.798 (October 2010) "Characteristics of optical transport network hierarchy equipment functional blocks," G.805 (March 2000) "Generic functional architecture of transport networks," G.872 (October 2012) "Architecture of optical transport networks," G.798.1 (April 2011) "Types and characteristics of OTN equipment," G.7710 (February 2012) "Common equipment management function requirements," G.7714.1 (April 2003) "Protocol for automatic discovery in SDH and OTN networks," G.873.1 (July 2011) "OTN Linear Protection," and G.873.2 (April 2012) "ODUk Shared Ring Protection," the contents of each are incorporated by reference herein.

Currently, the state of the art technology for optical transport and switching systems is based on OTN, such as through G.709 and the like. One of the capabilities defined by the OTN standards is the concept of tandem connection monitoring (TCM). Tandem connection monitoring provides the ability to monitor arbitrary segments of an optical path through the optical transport and switching network. This capability is critical to the ability of an operator to efficiently manage that segment of an end-to-end path carried within the domain of that operator, independent of segments provided through other operator domains or of the end-to-end path itself. The OTN tandem connection monitoring functionality is supported through six sets of overhead information (six levels of tandem connection monitoring), each including three overhead bytes supporting bit error monitoring, trace identifier functions, and Tandem Connection Monitor (TCM) status. In addition, a TCM Activation byte was allocated to support activation of TCMs but the specific use of this byte is currently not defined.

When faults and/or performance errors occur within an operator network, it is necessary to localize the source of the problem, i.e., identify the specific defective equipment or facility, in order to initiate repair activities. Links/connections within an operator domain are today monitored using normal TCMs at their endpoints. Conventionally, maintenance activities related to fault localization are performed manually. Usually this is performed by the use of loopbacks and test sets or through direct test access where the connection is monitored and tested remotely using test sets. Loopbacks are disruptive to the end-to-end service. This can be an issue when the service is exhibiting intermittent behavior and is still providing some level of customer service. The service is totally unusable while the loopback is operational and the loopback may need to be activated for extended periods to detect intermittent behavior. Remote test access is generally only available at switching nodes, it is not provided by all equipment so its use has limitations (not every monitor point may be accessible). Remote test access, where provided, can usually be performed in monitor or split modes. The split mode has the same effect as a loopback; the service is unavailable during this state. The monitor mode is usable but requires remote test equipment and is susceptible to defects/errors within the access line itself.

Additionally, no automated means of performing fault localization currently exists for OTN equipment. A function critical to the management of an operator network is the ability to perform maintenance functions for connections through the operator domain (the domain monitoring role). This requires not only the ability to monitor the domain connection but to localize problems with the connection should they arise. Current state of the art for TCM control is to use the control plane to automatically assign TCMs based on the connection configuration during connection establishment. However, the ability to configure TCMs for service maintenance has not be addressed and there are no applications known for either automatic or manual fault localization.

BRIEF SUMMARY OF THE DISCLOSURE

In an exemplary embodiment, an Optical Transport Network (OTN) fault localization method includes localizing a fault in a multi-domain OTN network to either an inter-domain link (IrDL) or an administrative domain in the multi-domain OTN network based on monitoring endpoint tandem connection monitors; responsive to the fault being in the administrative domain, localizing the fault within the administrative domain through a first iterative process with a first fault localization tandem connection monitor within the administrative domain; and responsive to the fault being in the inter-domain link (IrDL), localizing the fault to a network element or a link within the inter-domain link (IrDL) utilizing a second iterative process with a second fault localization tandem connection monitor within the inter-domain link.

In another exemplary embodiment, an iterative Optical Transport Network (OTN) fault localization method includes determining a next monitoring point; configuring a fault localization tandem connection monitor at the determined next monitoring point; executing a test between the fault localization tandem connection monitor and an associated endpoint tandem connection monitor; if the test fails, determining a location of the fault based on a position of the fault localization tandem connection monitor; and, if the test succeeds and the fault localization tandem connection monitor is not at a last test point, repeating the determining, configuring, and executing steps.

In yet another exemplary embodiment, an Optical Transport Network (OTN) includes at least two administrative domains each including a plurality of OTN network elements interconnected therebetween via intra-domain (IaDL) links within the at least two administrative domains; an inter-domain link (IrDL) interconnecting the at least two administrative domains; a first set of endpoint tandem connection monitors within each of the at least two administrative domains; a second set of endpoint tandem connection monitors on the inter-domain link (IrDL); and a controller communicatively coupled to each of the plurality of OTN network elements, wherein the controller is configured to: detect a fault; localize the fault to either one of the at least two administrative domains or the inter-domain link (IrDL)

based on monitoring the first set of endpoint tandem connection monitors and the second set of endpoint tandem connection monitors; responsive to the fault being in one of the at least two administrative domains, localize the fault within the one of the at least two administrative domains through a first iterative process with a first fault localization tandem connection monitor within the one of the at least two administrative domains; and, responsive to the fault being in the inter-domain link (IrDL), localize the fault to a network element or a link within the inter-domain link (IrDL) utilizing a second iterative process with a second fault localization tandem connection monitor within the inter-domain link.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
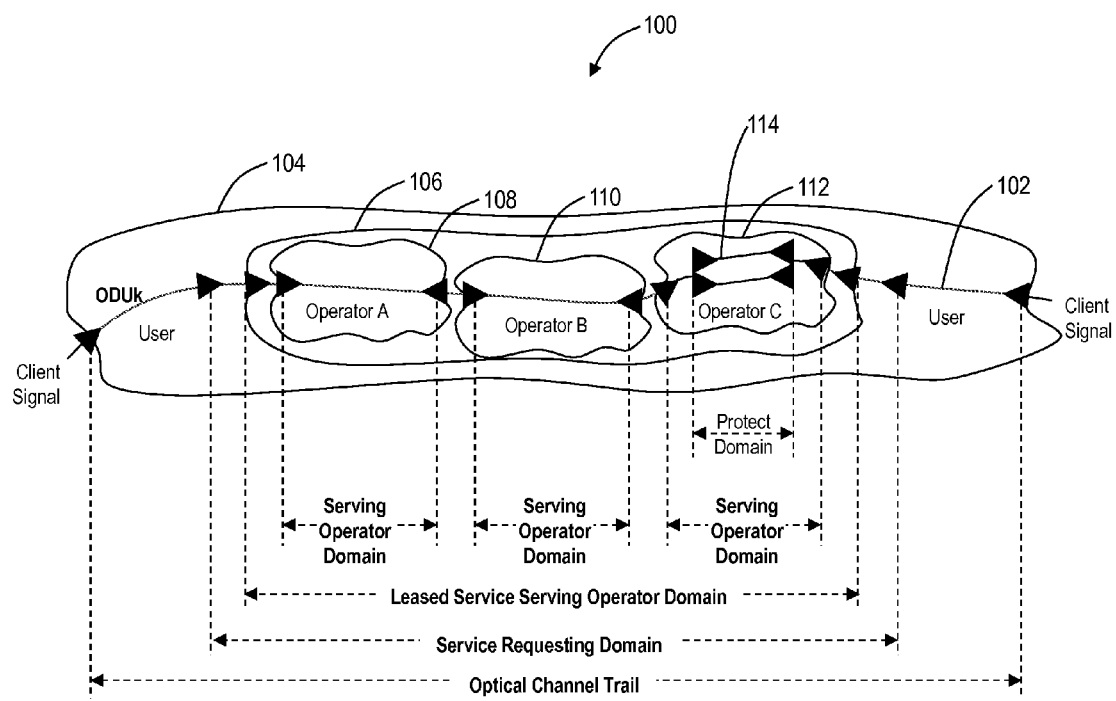
FIG. 1 is a network diagram of a network showing an end-to-end trail operating across administrative domains.

In various exemplary embodiments, fault localization systems and methods using Tandem Connection Monitors (TCMs) in Optical Transport Network (OTN) are described. Links/connections within an operator domain are conventionally monitored using normal TCMs at their endpoints. The fault localization systems and methods use OTN tandem connection monitors operating in a "Monitor" mode (monitor mode TCM or MMTCM) to provide the tool to enable this localization function. An MMTCM, operating at the same TCM level as the endpoint TCMs of the defective link/connection, is sequentially inserted at intermediate points (within the transport equipment) between the endpoint TCMs beginning at one end of the link/connection. Once inserted, the MMTCM supports monitoring of the connection segment from the beginning endpoint TCM of the link/connection up to the location of the MMTCM, while still allowing the link/connection to operate normally end-to-end.

Once configured the connection segment can be tested, either by direct access to the MMTCM itself or through single-ended maintenance information accessed at the beginning endpoint TCM through backward defect and error indications provided by the MMTCM. In effect, the MMTCM operates in a manner analogous to a loopback operation, either a facility loopback or a terminal loopback depending on the location of the MMTCM within the equipment. If the test passes then the link/connection up to that point is operating properly and the MMTCM is removed and then re-inserted at the next downstream monitoring point. If the test fails then the location of the problem is determined, either a facility or an equipment depending on the MMTCM location. The entire process, insertion of an MMTCM, test execution, removal of the MMTCM and reinsertion at the next downstream monitoring point, etc., may be automated, partially automated, or manually executed. Automated portions may be executed by a management system application or an automated control plane.

The fault localization systems and methods provide a major value add to operators. Maintenance functions are some of the most difficult and time consuming of all carrier operation. With the introduction of OTN and the use of tandem connection monitoring, the process of fault localization is complicated by the fact that improper use of TCMs for maintenance purposes can actually disrupt traffic and cause service outage. This means that maintenance personnel must be well trained in the use and operation of TCMs which results in additional carrier expense. The fault localization systems and methods provide a mechanism for fault localization that allows application level software to initiate and control the fault sectionalization process without user intervention. This saves time, money, and possible inadvertent loss of service.

Optical networking equipment based on the OTN standards defined by the ITU supports, as part of its functionality, monitoring of arbitrary sub-network connections. These monitoring functions are called Tandem Connection Monitoring (TCM) and are used to monitor segments of an end-to-end OTN trail (path). Six levels of TCM, each with various modes of operation, are provided to allow for simultaneous use for different monitoring applications along any individual trail. These applications include: segment protection, administrative domain monitoring, service monitoring, fault localization, verification of delivered quality of service, delay measurements and adjacency discovery.

TCM functions may be cascaded or nested. When cascaded, the same TCM level may be reused between different nodes in the same connection. When nested, if not assigned and configured correctly, the contents of the particular TCM may be overwritten, causing misinterpretation at the receiving end. There are no mechanisms in the current OTN standards that automatically ensure such misconfiguration does not occur. TCM levels are not automatically assigned and configured. This raises the following questions: "What TCM level and TCM mode should be used for a particular application?"; "How is the TCM level and mode assigned?"; and "How are TCM assignment conflicts avoided?"

As a result it is critical for TCM to be carefully administered within a particular network and its use across different administrative domains (e.g., different carrier networks) must be negotiated. The systems and methods described herein provide background information on the definitions, modes, and applications of TCM and defines guidelines for interworking of TCM in order to reduce the administration associated with TCM assignment and configuration. TCM assignment using a role-based approach is proposed with default assignment of TCM levels and modes. These defaults would be followed unless specific requirements within a particular network necessitate deviations from the default values. The systems and methods also consider the role of the control plane in configuring and administrating TCM levels as well as automated fault localization.

A number of ITU-T Recommendations provide information regarding TCM definition and operations as described above. ITU-T Rec. G.805 deals with common architectural concepts of transport networks including tandem connection monitoring. It defines a tandem connection as an arbitrary series of contiguous "link connections" and/or "subnetwork connections" which represents the part of a trail that requires monitoring independently from the monitoring of the complete trail. It also defines the functions required for tandem connection monitoring. These functions include (but are not limited to): Monitoring functions for the tandem connection that are independent of defects and errors that occur upstream of the tandem connection (outside the tandem connection endpoints); Verification of tandem connection connectivity and continuity; Fault management of the tandem connection including detection and reporting of near-end and far-end failure/alarm conditions; and Performance management of the tandem connection including detection and reporting of near-end and far-end error performance G.805 also defines several applications for tandem connection monitoring based on the concept of a monitoring domain. Three general tandem connection domain applications are identified. First, a protected domain is a domain where tandem connection monitors are used to monitor the status (failure state and error performance) of working and protection connections for the purposes of controlling protection switching operations. Second, a Serving operator administrative domain is a domain where a tandem connection monitor is used by a service provider (e.g., carrier or carrier's carrier) to monitor the status (failure state and error performance) of a connection delivered to a customer (e.g., an end customer or another carrier). Third, a Service requesting administrative domain is a domain where a tandem connection monitor is used by a customer to monitor the status (failure state and error performance) of a connection received from a service provider.

ITU-T Rec. G.872 extends the architectural concepts provided by Rec. G.805 that are applicable to optical transport networks. It discusses architectural concepts of optical channel connection monitoring including tandem connection monitoring. ITU-T Rec. G.872 discusses the concept of nested connections up to the maximum number of levels defined by the requirements of the specific technology (e.g., ITU-T Recommendation G.709). It notes that the number of connection monitoring levels that can be used by each operator/user involved in an optical channel connection must be negotiated by the parties involved. It also provides an example of a typical optical channel connection with five levels of nested connection monitoring.

Referring to FIG. 1, in an exemplary embodiment, a network diagram illustrates a network 100 showing an end-to-end trail 102 operating across administrative domains 104, 106, 108, 110, 112. Specifically, the end-to-end trail 102 is an Optical channel Data Unit level k (ODUk) traversing a user domain 104, a leased service serving operator domain 106, operator A's domain 108, operator B's domain 110, and operator C's domain 112. FIG. 1 is based on FIG. 7 of G.872 an illustrates the end-to-end trail 102 that contains the domain 106 extending from a customer interface across the serving operator administrative domains 108, 110, 112 providing the leased service to another customer interface. Within the leased service serving operator administrative domain 106 are three separate cascaded service operator administrative domains 108, 110, 112, and the domain 112 contains a protected domain 114. The customer monitors the quality of the leased service while the leased service serving operator monitors the quality of service provided to the customer. In addition, each serving operator domain 108, 110, 112 is monitored independently along with the protected domain within one of the serving operator domains. In this example, the same TCM level is reused by Operators A, B and C for end-to-end monitoring of their specific domains.

Figure 2:
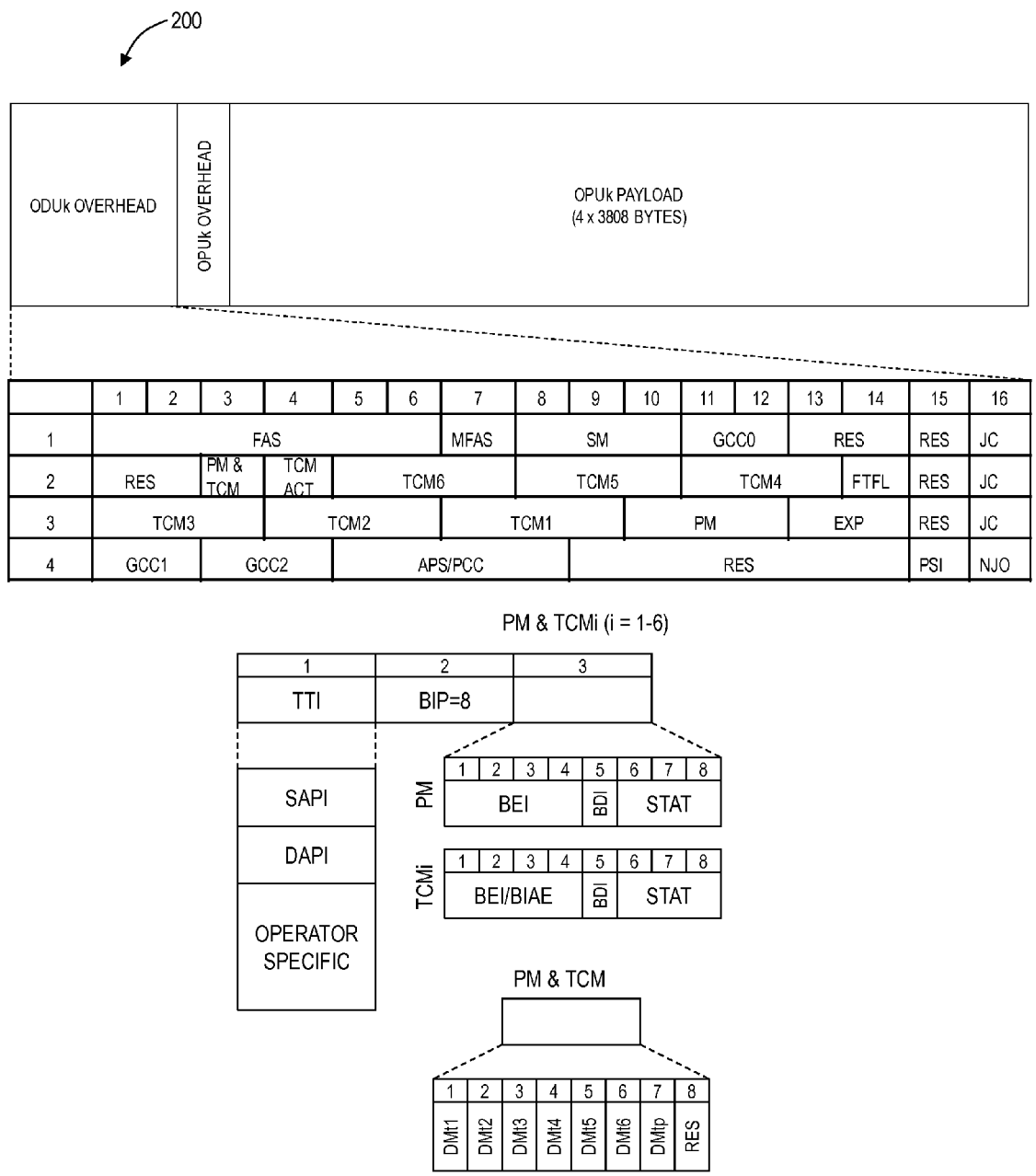
FIG. 2 is a block diagram of ITU-T Recommendation G.709 overhead.

Referring to FIG. 2, in an exemplary embodiment, a block diagram illustrates G.709 overhead 200. ITU-T Rec. G.709 defines the overhead required to support tandem connection monitoring for the OTN. This includes all TCM bit and byte assignments within the OTN frame structure and the definition of the functions of those bits and bytes. G.709 specifies that OTN provides six fields or levels of ODUk TCM (referred to as TCM1, TCM2, TCM3, TCM 4, TCM5, and TCM6) and the number of active TCM levels along an ODUk trail may vary between 0 and 6. At domain interfaces, G.709 specifies that the provisioning of the maximum number of levels which will be passed through the domain is possible (default of three levels). These tandem connections should use the lower levels (i.e. TCM1, TCM2 or TCM3). Levels beyond the maximum may/will be overwritten in the domain.

The G.709 overhead 200 is partitioned into Optical channel Transport Unit (OTU) frame alignment bytes in row 1, columns 1-7; Optical channel Data Unit (ODU) overhead bytes in rows 2-4, columns 1-14; OTU overhead bytes in row 1, columns 8-14; and Optical channel Payload Unit (OPU) overhead in rows 1-4, columns 15-16. Further, the G.709 overhead 200 includes Forward Error Correction (FEC) data (not shown) in the frame. The OTU frame alignment bytes include a frame alignment signal (FAS) bytes and a multi-frame alignment signal (MFAS). Also, the G.709 overhead 200 includes section monitoring (SM) bytes and path monitoring (PM) bytes to provide optical layer error management between optical section and path in G.709. The SM bytes include dedicated bit-interleaved parity (BIP-8) monitoring to cover the payload signal. The first byte of the SM used for Trail Trace Identifier (TTI) which is a 64-byte character string similar to a section trace in SONET. The PM bytes include dedicated BIP-8 monitoring to cover the payload signal. The first byte of the PM is used for TTI which is similar to path trace in SONET.

A general communication channel 0 (GCC0) bytes provide a communications channel between adjacent G.709 nodes. The G.709 overhead 200 further includes a payload signal identifier (PSI), justification control (JC), and negative justification opportunity (NJO). For asynchronous clients such as 10 GbE and 10 G FC, NJO and PJO are used as stuff bytes similar to PDH. If the client rate is lower than OPU rate, then extra stuffing bytes may be inserted to fill out the OPU. Similarly, if the incoming signal is slightly higher than the OPU rate, NJO and PJO bytes may be replaced with signal information, i.e. the OPU payload capacity is increased slightly to accommodate the extra traffic on the transceiver, and the JC bytes reflect whether NJO and PJO are data or stuff bytes the JC bytes are used at the off-ramp to correctly de-map the signal. The PSI provides an identification of the payload signal. Further, the G.709 overhead 200 also includes six levels of Tandem Connection Monitoring (TCMn).

G.709 specifies that the TCM functions for monitored connections may be nested, cascaded or both. Overlapping of TCM functions is an additional configuration supported for testing purposes only but must be operated in a non-intrusive mode where maintenance signals are not generated. G.709 also describes the network applications supported by the ODUk TCM functions and references [ITU-T G.805] and [ITU-T G.872]. The applications referenced are the service requesting administrative domain (called optical UNI-to-UNI (user-network interface) tandem connection monitoring), service operator administrative domain (called optical NNI-to-NNI (network-network interface) tandem connection monitoring), and protected domain (linear protection, shared ring protection, and automatic restoration) applications. In addition, G.709 identifies the use of TCM functions to support fault localization and service maintenance functions.

ITU-T Rec. G.798 provides the modeling of the OTN equipment functional blocks including the TCM functions. The definition of the TCM processing includes defect detection and generation, defect correlation, consequent actions (e.g., maintenance signal generation), and performance monitoring functions. G.798 also provides an appendix with examples of TCM applications. G.798 models TCM functions through separate termination, adaptation, and control elements. The termination and adaptation elements are further sub-divided into separate unidirectional components dedicated to TCM source and sink operations. The termination elements deal mainly with the generation and insertion of TCM overhead bits/bytes at the source end of a tandem connection, and extraction and processing of the TCM overhead bits/bytes at the sink end of a tandem connection. The adaptation elements deal mainly with the layer-to-layer processing required at the source and sink ends of a tandem connection (e.g., detection of incoming alignment errors or insertion of maintenance signals).

ITU-T Rec. G.798.1 provides an example of assigned TCM levels within a network and describes the maintenance signal interactions (e.g., alarm indication signal (AIS) propagation) between tandem connections that are concatenated in the same sublayer and between tandem connections that are at different sublayers. ITU-T Rec. G.7710 provides information related to management of TCM functions (configuration, fault, performance, etc.) including TCM activation. One of the aspects of activation that Rec. G.7710 covers is the activation of a TCM for different nesting scenarios. These include activating a TCM that is nested within one or more other TCM levels, activating a TCM that has one or more existing TCM levels nested within it, and activating a TCM that is a combination of the previous two cases. This document specifies that two activation behaviors are possible from a network element perspective: TCM levels can be allocated flexibly, that is, in any order; and TCM levels cannot be allocated flexibly, that is, they require a fixed ordering. The first case requires only that the TCM be activated at the correct location with respect to any existing TCM levels. The second case may require that existing TCM levels be rearranged in order to support a new TCM level.

ITU-T Rec. G.7714.1 describes the methods, procedures and transport plane mechanisms for discovering layer adjacency for automatically switched optical networks (ASON). Section 6 of G.7714.1 points out the use of the TTI field of TCM level 6 as the default mechanism for carrying layer adjacency discovery messages. ITU-T Recs. G.873.1 and G.873.2 define the automatic protection switching (APS) protocol and protection switching operation for OTN linear and ring protection schemes at the ODUk level. One of the key schemes provided in G.873.1 and G.873.2 is ODUk subnetwork connection protection with sublayer monitoring (SNC/S). In this case protection switching is triggered by signal fail or signal degrade defects detected at the ODUkT sublayer trail (TCM). An ODUkT sublayer trail is established for each working and protection entity. Protection switching is triggered only on defects of the protected domain. The Recommendations point out that care has to be taken to make sure that there are no overlapping domains of use of a TCM level (i.e. TCM levels should only be used in nested or concatenated modes). Rec. G.873.2 also suggests the use of TCM level 6 for monitoring an ODUk connection which is supported by two or more concatenated ODUk link connections (supported by back-to-back OTUk trails). G.873.2 specifies an ODU SRP-1 protection application which uses the TCM6 field to monitor the status/performance of the ODU connection between two adjacent ODU SRP-1 nodes.

ITU-T Rec. G.798 defines three modes for TCM: an Operational mode, a Transparent mode, and a Monitoring mode. In the Operational mode, the TCM information is extracted from the TCM field and used to trigger actions such as alarm generation, switching action, etc. In the Transparent mode, the TCM information is passed through without change (i.e., transparently) and no processing is performed. In the Monitoring mode, TCM information is processed to recover defects and status information, but is still passed through unchanged to succeeding nodes.

Figure 3:
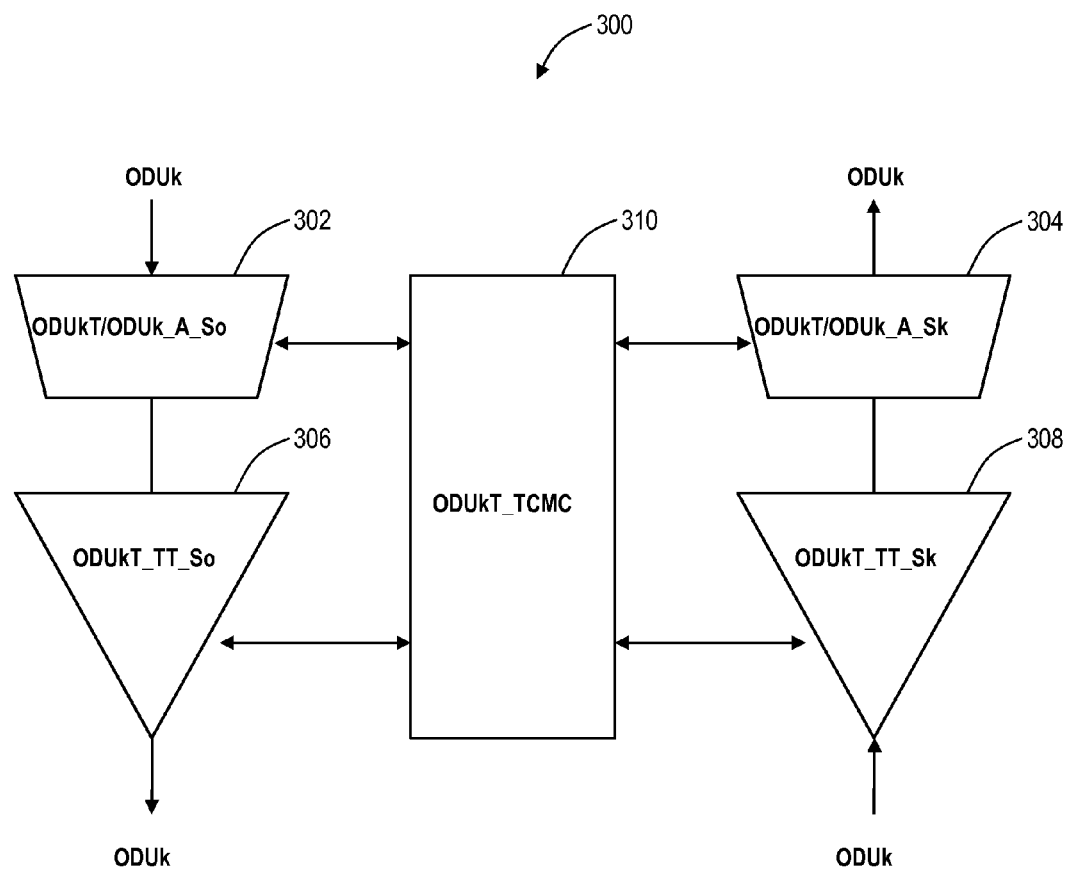
FIG. 3 is a block diagram of TCM functional blocks from ITU-T Recommendation G.798.

Referring to FIG. 3, in an exemplary embodiment, a block diagram illustrates TCM functional blocks 300 from ITU-T Recommendation G.798. The Rec. G.798 TCM functional blocks and their basic functionality include the following: ODUkT/ODUk_A_So: ODUkT/ODUk Adaptation Source Function 302, ODUkT/ODUk_A_Sk: The ODUkT/ODUk Adaptation Sink Function 304, ODUkT_TT_So: ODUkT Trail Termination Source Function 306, ODUkT_TT_Sk: ODUkT Trail Termination Sink Function 308, and ODUkT_TCMC: TCM Control Function 310. The ODUkT/ODUk Adaptation Source Function 302 starts a selected TCM level and can initiate maintenance signals (LCK) if operational, provides access to ODUk PM (performance monitoring), and inserts APS Overhead if operational. The ODUkT/ODUk Adaptation Sink Function 304 ends a selected TCM level and can initiate maintenance signals (ODUk AIS, LCK) if operational, provides access to ODUk PM, and accesses APS Overhead if operational. The ODUkT Trail Termination Source Function 306 computes the BIP-8, adds tandem connection monitoring overhead (TCMOH) if operational, and inserts Backward Defect Indication (BDI)/Backward Error Indication (BEI) if operational or monitoring. The ODUkT Trail Termination Sink Function 308 computes BIP8, collects defects for PM, and extracts TCMOH if operational or monitoring. The TCM Control Function 310 is responsible for activation and deactivation of a TCM trail, sets TCM level, and sets modes for termination and adaptation functional blocks.

The following table summarizes the different combinations of TCM mode and where they are used.

| Source/Sink | Use | ODUkT_TT Mode | ODUkT/ODUk_A Mode | Functions |
|---|---|---|---|---|
| Source | TCM assigned | Operational | Operational | Originate TCM Trail Insert TTI, BIP8 Insert BDI, BEI/BIAE, LCK Insert IAE Insert APS Insert and Process DM |
| Source | TCM not assigned | Transparent | Transparent | Transparent Pass Through of TCMOH |
| Sink | TCM assigned | Operational | Operational | Terminate TCM Trail, Reset TCMOH Process BIP8 Extract TTI Extract BDI, BEI/BIAE Extract STAT Return DM to Remote Point Return BDI, BEI/BIAE to Remote Point Extract APS Insert ODUk LCK Insert ODUk AIS/SSF Consequent Action |
| Sink | "Shadow" TCM assigned | Operational | Transparent | Transparent Pass Through of TCMOH Process BIP8 Extract TTI Extract BDI, BEI/BIAE Extract STAT Return DM to Remote Point Return BDI, BEI/BIAE to Remote Point |
| Sink | Test Purposes | Monitor | Operational | Terminate TCM Trail, Reset TCMOH Process BIP8 Extract TTI Extract BDI, BEI/BIAE Extract STAT Return BDI, BEI/BIAE to Remote Point Extract APS Insert ODUk LCK Insert ODUk AIS/SSF Consequent Action |
| Sink | Test Purposes | Monitor | Monitor (or Transparent) | Transparent Pass Through of TCMOH Process BIP8 Extract TTI Extract BDI, BEI/BIAE Extract STAT Return BDI, BEI/BIAE to Remote Point |
| Sink | | Transparent | Operational | For further study |
| Sink | TCM not assigned | Transparent | Transparent | Transparent Pass Through of TCMOH |
| Sink | SNC/N Protection | Non-Intrusive Monitor | | Process BIP8 Extract TTI Extract BDI, BEI/BIAE Extract STAT |

Many of the ITU-T Recommendations address various TCM applications. Recs. G.805, G.872, and G.709 provide information related to three basic applications based on partitioning of the network into specific domains: protected domains (linear, ring, etc.); serving operator administrative domains (which can be nested or cascaded); and service requesting administrative domains (associated with the customer leasing the service from the service operators). The protection standards define the use of TCM for link monitoring for linear (Rec. G.873.1) and ring (Rec. G.873.2) applications. Rec. G.709 includes the use of TCM for fault sectionalization and isolation, i.e., maintenance functions. Rec. G.7714.1 includes the use of TCM for layer adjacency discovery operations.

In addition to roles-based applications, Rec. G.709 includes TCM allocation from a broad perspective by specifying which set of TCM levels should be assigned to pass through a domain (the lower TCM levels) and which TCMs should be assigned within the domain (the higher TCM levels). In fact, example multi-domain configurations suggest but do not require specific levels for specific applications. In general, TCM assignment must to be negotiated within the service provider community. Rec. G.873.2, defines a specific TCM level (TCM6) for link monitoring in support of ring protection, and Rec. G.7714.1 specifies TCM6 for layer adjacency discovery functions. So precedent has been set for defining specific TCM levels for specific applications, although this has not been broadly applied and negotiation of TCM levels between service providers is still necessary in general.

Figure 4:
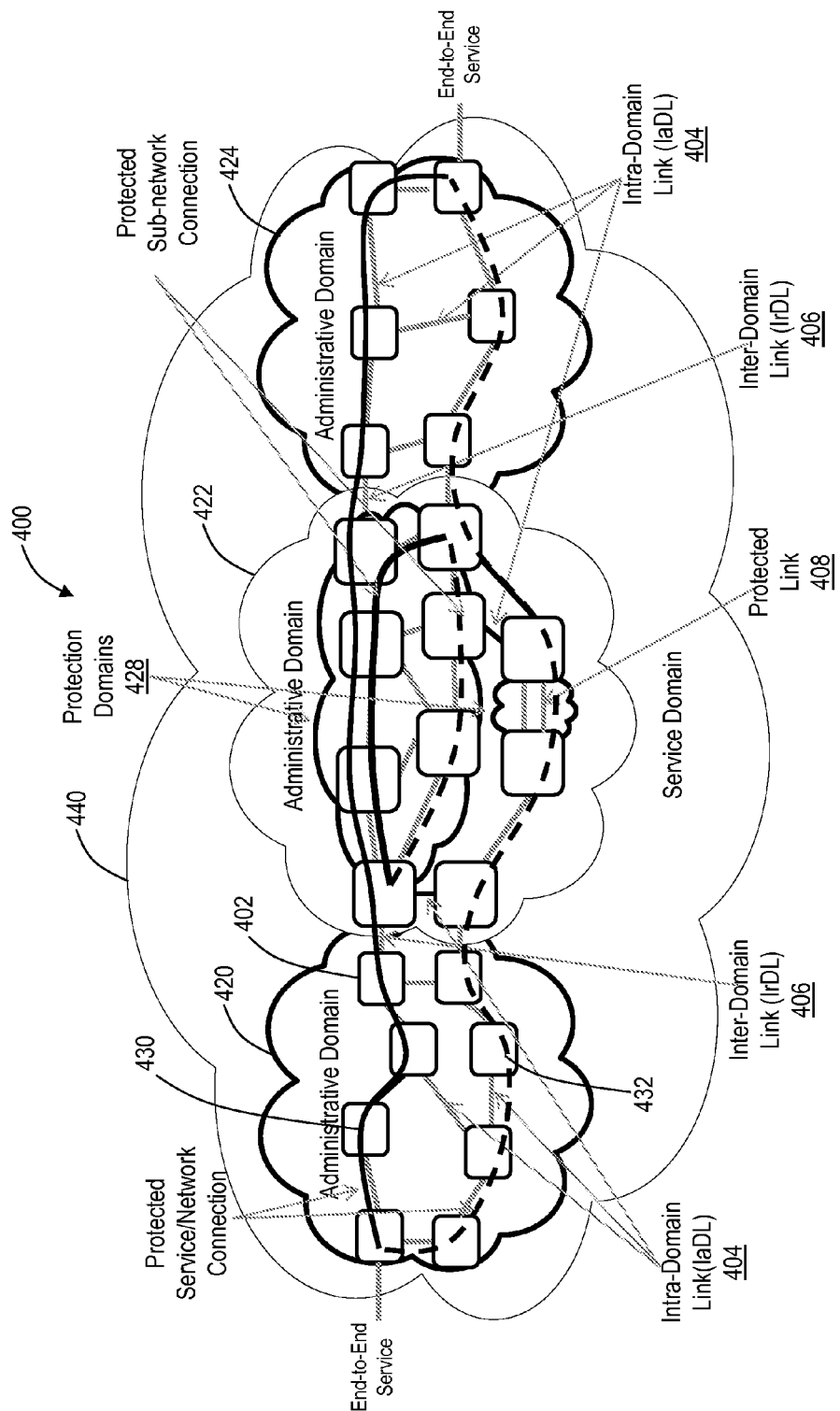
FIG. 4 is a network diagram of an exemplary network with domain identification for a roles-based assignment scheme of TCMs.

Referring to FIG. 4, in an exemplary embodiment, a network diagram illustrates an exemplary network 400 with domain identification. The network 400 is used to identify a set of roles each of which can be assigned a specific TCM level. By assigning a specific level to a specific role the possibility of automatic assignment and configuration of TCM without carrier negotiation of TCM level usage for the majority of end-to-end service connections may be supported. Only in special case situations would TCM negotiation be required. The exemplary network 400 is physically formed by multiple OTN network elements 402 interconnected therebetween and segmented into domains. The network elements 402 are interconnected via links which can include intra-domain links (IaDL) 404, inter-domain links (IrDL) 406, or protected links 408. FIG. 4 is similar to FIG. 1 which was based on information from Rec. G.872. The main differences are that the network 400 does not include the customer network portion, since the foregoing is intended to mainly address service provider aspects, and the network 400 specifically identifies node-to-node links.

Links between nodes contained within a particular administrative domain (e.g., service provider network), or serving operator administrative domain from Rec. G.805, are referred to as the intra-domain links (IaDL) 404, while links that interconnect nodes in different administrative domains are termed the inter-domain links (IrDL) 406. Links between nodes, either IaDL or IrDL links, may be unprotected or protected. The protected links 408 exist within a protection domain. An end-to-end network that provides service to an end customer is made up of one or more administrative domains 420, 422, 424. Note, a particular service provider network may itself consist of multiple administrative domains. Each of the administrative domains 420, 422, 424 can provide connectivity across its nodes and links to allow services to be established across its domain. These administrative domain connections may be protected on a segment by segment basis where a segment could traverse one or more links, or they could be protected on an end-to-end basis. A protection domain 428 could exist for each protected segment or for the entire connection across the administrative domain.

An end-to-end customer service 430, 432 is supported across the network of one or more administrative domains 420, 422, 424. This is referred to as a service domain 440 and is equivalent to the leased service serving operator administrative domain from G.872. That connection may also be unprotected or protected, and if protected has an associated protection domain. There are several components of the network 400 that require monitoring. These include the links, either intra- or inter-domain links 404, 406, the domain connections that traverse an administrative domain 420, 422, 424, and the service connections 430, 432 that traverse the service domain 440. Also any links or connections that are protected must be monitored to control protection switching operations. All of these components within an OTN network would utilize TCM functions and are candidates for automatic TCM assignment and configuration. Specifically, the links 404, 406, 408 are monitored in order to support fault isolation functions and may require monitoring to support protection functions if protected. The Administrative domain connections are monitored to support fault isolation functions, validate domain connection quality, and may require monitoring to support protection functions if protected. The Service connections 430, 432 (across one or more administrative domains) are monitored to validate service level agreements and may require monitoring to support protection functions if protected.

In an exemplary embodiment, the information provided by the ITU-T Recommendations can be extended to form the basis of roles-based TCM assignment. In order to support the configuration of TCMs, the systems and methods can use an assignment of TCM levels based on network management "roles". Examples of several roles being studied are link monitoring, monitoring for the purposes of controlling link or path protection functions, domain connection monitoring (monitoring of a connection segment within a single operator domain), service monitoring (monitoring of an end-to-end service connection by a service provider that may transit multiple operator domains), and end customer domain monitoring (customer monitoring of the service connection provided by the service provider).

Figure 5:
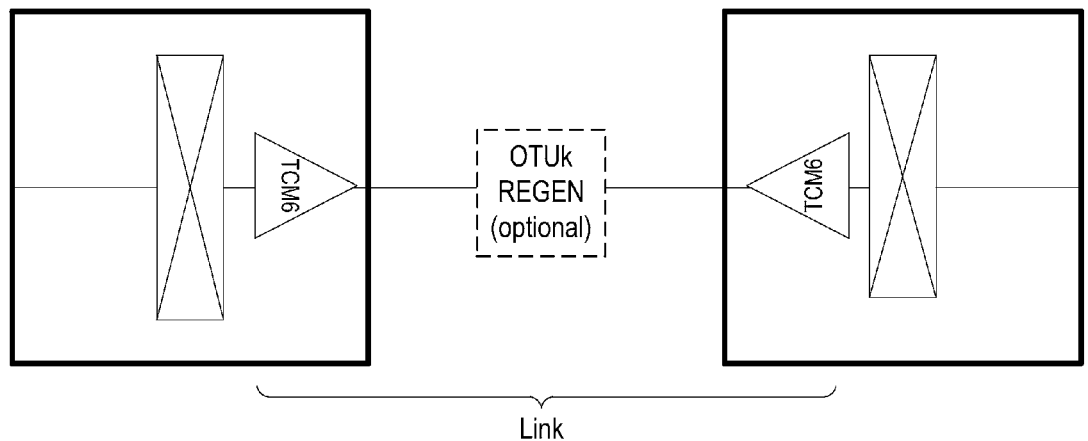
FIGS. 5-12 are diagrams of various links being monitored using various different TCMs via a roles-based assignment scheme.
Figure 6:
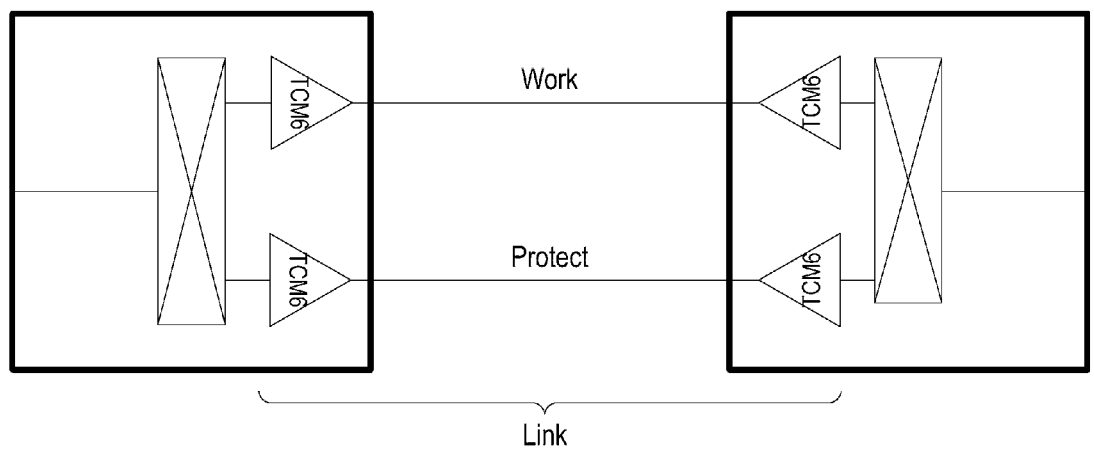

Referring to FIGS. 5-12, in exemplary embodiments, diagrams illustrate various links being monitored using various different TCMs via a roles-based assignment scheme. FIG. 5 illustrates unprotected link monitoring points using TCM6 as a recommendation. In this role, TCM6 supports the following Link failure/degrade detection (with or without OTUk regenerators) and fault sectionalization, Link level APS (line switching equivalent), and Link layer adjacency discovery. This TCM level could be automatically assigned and configured at link interface provisioning time. Both unprotected and protected configurations can be supported. Note that it is possible for an OTUk regenerator to be present within the monitored link shown in FIG. 5. FIG. 6 illustrates an SNC/S protected link using TCM6 as a recommendation. For link monitoring only SNC/S protection should be implemented. Though SNC/N link protection could be implemented, it is not recommended. SNC/N configurations cannot support layer adjacency discovery of working and protect links since only a non-intrusive monitor is present on the link side of the switch (the non-intrusive monitor has no ability to insert discovery information). For layer adjacency discovery, ITU-T Rec. G.7714.1 specifies a specific discovery message format utilizing the TTI byte of TCM6 for this function.

Protection may be required on subnetwork connections within an administrative domain. These subnetwork connections may traverse the domain end-to-end or traverse only a portion of the domain. Subnetwork connections that traverse only a portion of the domain may be cascaded. Each subnetwork connection may be independently protected. In this role, TCM supports the following protection configurations: SNC/S protection: supports bounded protection domains without sympathetic switching (protection domain is bounded by the TCM); and SNC/N protection: supports unbounded protection domains that may exhibit sympathetic switching (protection domain boundaries is not bounded by the TCM but by non-intrusive monitors) As a recommendation, TCM mode and level assignment: Operational mode TCM5 (TCM3 should be utilized for SNC/S protection of end-to-end service connections, see End-to-End Service Monitoring section).

Figure 7:
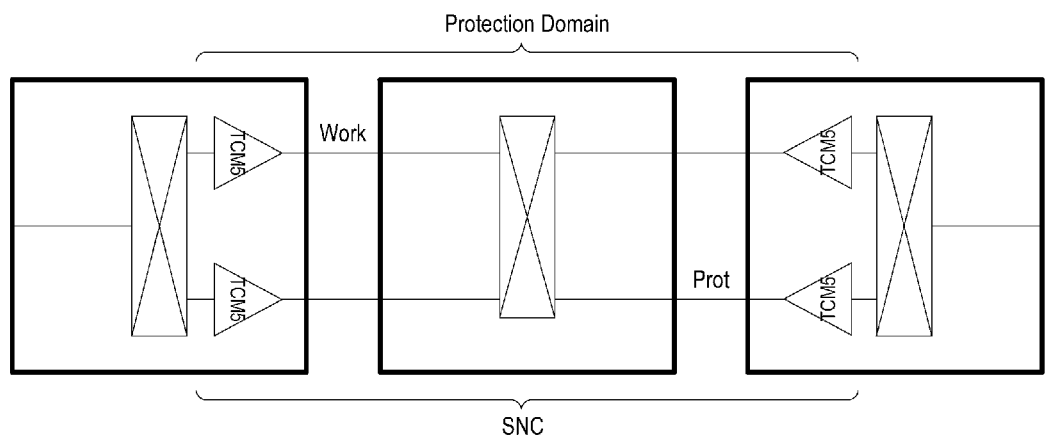

FIG. 7 illustrates an SNC/S protected domain using TCM5 as a recommendation. For SNC/S protected link monitoring points, the TCMs are terminated on the network side of the switch function. Note that nested link monitors may exist on any node-to-node links (as defined in the Link Monitoring section). The protection switching domain is bounded by the TCM terminations so failures outside the protection domain have no effect on protection switching operation. This is the preferred scheme for all intra-domain SNCP configurations (subnetwork connections within a domain that are not end-to-end). If the subnetwork connection traverses the domain end-to-end (see the End-to-End Domain Monitoring section) a separate TCM level must be assigned to monitor the end-to-end domain connection. Note that if this is an end-to-end service connection TCM level 3 should be used instead of TCM level 5.

Figure 8:
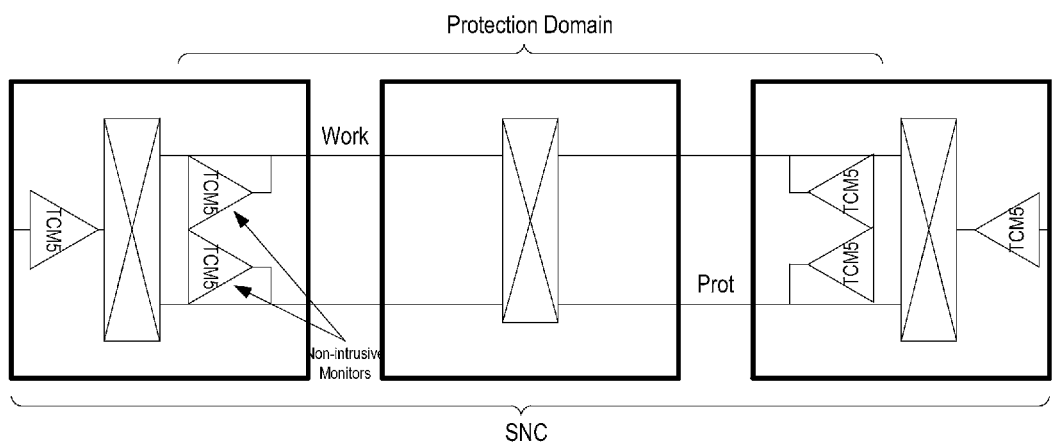

FIG. 8 illustrates an SNC/N (Subnetwork connection protection with non-intrusive monitoring) protected domain using TCM5 as a recommendation. For SNC/N protected link monitoring points, the TCMs are terminated outside the protection domain and non-intrusive monitors are provided to control the switch function. Note that nested link monitors may exist on any node-to-node links (as defined in the Link Monitoring section). The protection switching domain is not bounded by the terminated TCM but by the non-intrusive monitors, therefore it is possible for upstream defects to cause fault propagation into both working and protect subnetwork connections, which may result in sympathetic switching operation (switching due to faults outside the protection domain).

When protected SNCs are cascaded, TCM levels can overlap at the node common to the cascaded SNCs. This type of operation is defined in Rec. G.798 as being for test purposes only. For these reasons, use of this mechanism is only recommended when the TCM termination occurs within the same equipment as the non-intrusive monitoring function. This limits the possibility of upstream fault propagation into the protection domain. This scheme is applicable to end-to-end administrative and service domain connections (see the End-to-End Domain Monitoring and Service Monitoring sections).

Figure 9:
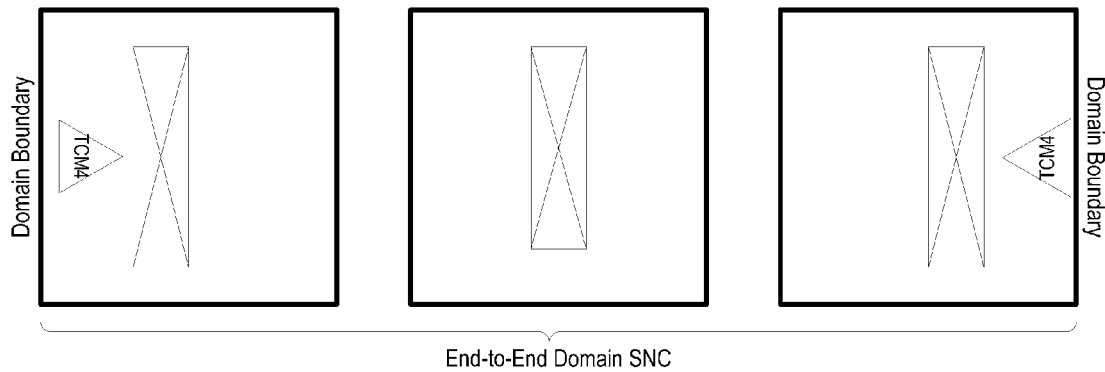

FIG. 9 illustrates end-to-end domain monitoring using TCM4 as a recommendation. For end-to-end domain monitoring, TCM supports the following functions: Domain failure/degrade detection and fault sectionalization, domain signal quality monitoring; and SNC/N protection of the end-to-end domain connection. Here, the recommended TCM mode and level assignment is Operational mode TCM4 plus optional TCM4 non-intrusive monitor (for SNC/N protection only). For Unprotected End-to-End Domain Monitoring Points, the TCM is terminated at the domain boundary. This termination is always required regardless of how protection is configured in order to provide the proper domain monitoring. Note that protection domains using TCM5 and link monitoring using TCM6 may be nested within the domain boundaries.

Figure 10:
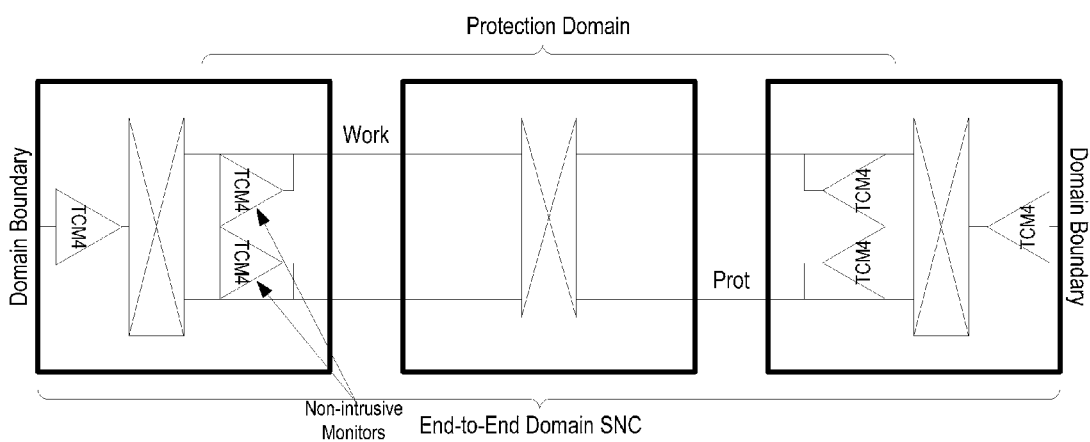

FIG. 10 illustrates end-to-end domain monitoring with SNC/N protection using TCM4 as a recommendation. For SNC/N Protected End-to-End Domain Monitoring Points, the TCM is effectively reused to support end-to-end domain protection. SNC/N protection is appropriate in this application since the domain termination and the non-intrusive monitors would be located within the same node. If an SNC/S protection scheme is desired then TCM5 would be utilized (see SNC Protection within a Domain section).

Figure 11:
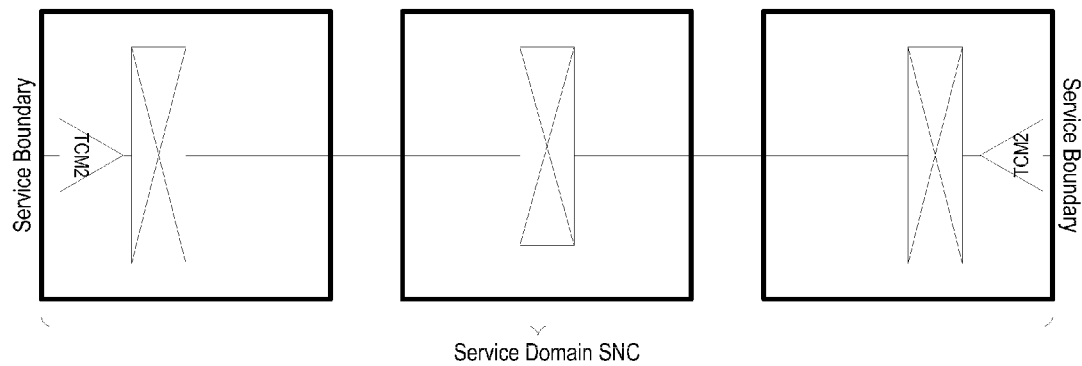

For end-to-end service monitoring, in this role, TCM supports the following functions: Service Layer Agreement (SLA) verification (may function as the Domain Monitor for a single domain service connection); and SNC/N protection of the end-to-end service connection, A recommended TCM mode and level assignment is Operational mode TCM2 plus optional TCM2 non-intrusive monitor (for SNC/N protection only). FIG. 11 illustrates end-to-end service domain monitoring using TCM2 as a recommendation. For Unprotected End-to-End Service Monitoring Points, the TCM is terminated at the service boundary. This termination is always required regardless of how protection is configured in order to provide the proper service monitoring. Note that administrative domains using TCM4, protection domains using TCM5 and link monitoring using TCM6 may be nested within the service boundaries.

Figure 12:
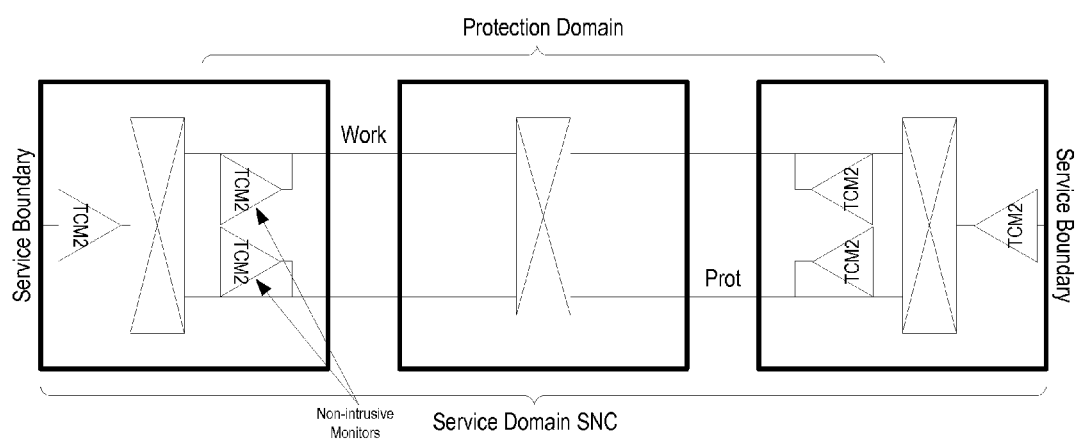

FIG. 12 illustrates end-to-end service domain monitoring with SNC/N protection using TCM2 as a recommendation. For SNC/N Protected End-to-End Service Monitoring Points, the TCM is effectively reused to support end-to-end service protection. SNC/N protection is appropriate in this application since the domain termination and the non-intrusive monitors would be located within the same node. If an SNC/S protection scheme is desired then TCM3 should be utilized (see SNC Protection within a Domain section).

For Customer TCM, in this role, TCM supports the following functions of service provider service quality verification. A recommended TCM mode and level assignment is Operational mode TCM1. In this role, a TCM is reserved for end-to-end customer use. This corresponds to the service requesting administrative domain from Rec. G.872. A service provider may utilize this TCM level when the mapping of the client signal (e.g., Ethernet client, SONET/SDH client, etc.) into an ODUk is provided by the service provider equipment.

As TCM introduces new capabilities into the transport network, it is appropriate to consider whether any new security risks are introduced. TCM is a part of the OTN header information. It should be noted that TCM is not used as a control channel for exchange of signaling messages, as is provided by the GCC fields in OTN. As shown in FIG. 2, TCM includes a set of subfields with specific purposes, similar to other header fields such as frame alignment, APS, etc. Interference with TCM requires direct access to the bit-stream or access to TCM control via the management interface into the network element. The potential impacts of tampering or misconfiguration of TCM include: Inadvertent or improper failing of a connection (or masking of failure); Inadvertent or improper failure action such as protection switching (or prevention of such action); and Incorrect fault localization or attribution. It should be noted that tampering with TCM would not by itself introduce the potential for misrouting of data to a different destination than intended. TCM does not introduce new vulnerability to threats, as access to the bitstream and management interface are existing threats. Securing of the management interface is a general problem that is addressed by OIF Implementation Agreements [OIF SMI-03.0].

Figure 13:
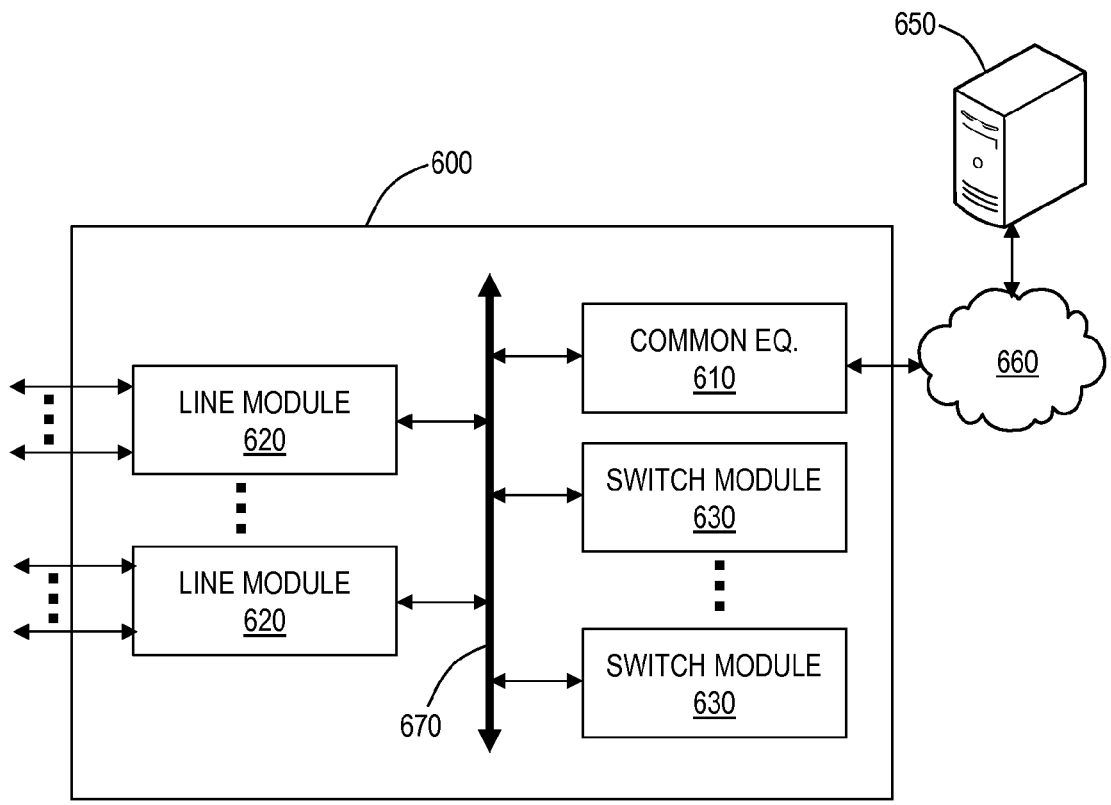
FIG. 13 is a block diagram of an exemplary network element for the fault localization systems and methods.

Referring to FIG. 13, in an exemplary embodiment, a block diagram illustrates an exemplary network element 600 for the fault localization systems and methods. In an exemplary embodiment, the exemplary network element 600 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the network element 600 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the network element 600 can be any digital system with ingress and egress digital signals and switching therebetween of channels, timeslots, tributary units, etc. utilizing OTN, SONET, SDH, etc. While the network element 600 is generally shown as an optical network element, the fault localization systems and methods contemplated for use with any switching fabric, network element, or network based thereon.

In an exemplary embodiment, the network element 600 includes common equipment 610, one or more line modules 620, and one or more switch modules 630. The common equipment 610 can include power; a control module; operations, administration, maintenance, and provisioning (OAM&P) access; user interface ports; and the like. The common equipment 610 can connect to a management system 650 through a data communication network 660. The management system 650 can include a network management system (NMS), element management system (EMS), or the like. Additionally, the common equipment 610 can include a control plane processor configured to operate a control plane as described herein. The network element 600 can include an interface 670 for communicatively coupling the common equipment 610, the line modules 620, and the switch modules 630 therebetween. For example, the interface 670 can be a backplane, mid-plane, a bus, optical or electrical connectors, or the like. The line modules 620 are configured to provide ingress and egress to the switch modules 630 and external to the network element 600. In an exemplary embodiment, the line modules 620 can form ingress and egress switches with the switch modules 630 as center stage switches for a three-stage switch, e.g. a three stage Clos switch. Other configurations and/or architectures are also contemplated. The line modules 620 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 620 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 620 can include wavelength division multiplexing interfaces, short reach interfaces, and the like, and can connect to other line modules 620 on remote network elements, end clients, edge routers, and the like. From a logical perspective, the line modules 620 provide ingress and egress ports to the network element 600, and each line module 620 can include one or more physical ports. For example, the line modules 620 can form the links described herein. The switch modules 630 are configured to switch channels, timeslots, tributary units, etc. between the line modules 620. For example, the switch modules 630 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 630 can include both Time Division Multiplexed (TDM) (i.e., circuit switching) and packet switching engines. The switch modules 630 can include redundancy as well, such as 1:1, 1:N, etc. In an exemplary embodiment, the switch modules 630 provide OTN, SONET, or SDH switching.

Those of ordinary skill in the art will recognize the network element 600 can include other components which are omitted for illustration purposes, and that the systems and methods described herein are contemplated for use with a plurality of different network elements with the network element 600 presented as an exemplary type of network element. For example, in another exemplary embodiment, the network element 600 may not include the switch modules 630, but rather have the corresponding functionality in the line modules 620 (or some equivalent) in a distributed fashion. For the network element 600, other architectures providing ingress, egress, and switching therebetween are also contemplated for the systems and methods described herein. In general, the systems and methods described herein contemplate use with any network element providing switching of OTN, SONET, SDH, etc. channels, timeslots, tributary units, wavelengths, etc.

Figure 14:
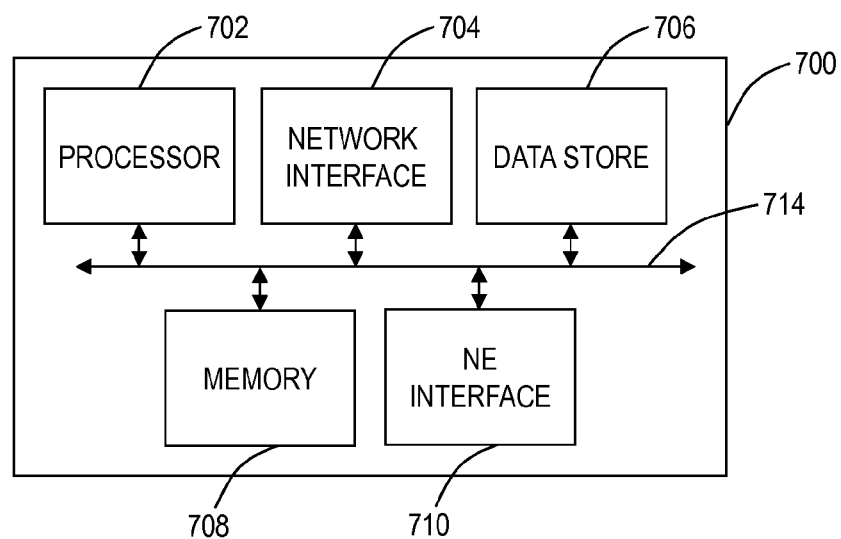
FIG. 14 is a block diagram of a controller to provide control plane processing and/or operations, administration, maintenance, and provisioning (OAM&P) for a node such as the network element of FIG. 13.

Referring to FIG. 14, in an exemplary embodiment, a block diagram illustrates a controller 700 to provide control plane processing and/or operations, administration, maintenance, and provisioning (OAM&P) for a node such as the network element 600. The controller 700 can be part of common equipment, such as common equipment 610 in the network element 600. The controller 700 can include a processor 702 which is hardware device for executing software instructions such as operating the control plane. The processor 702 can be any custom made or commercially available processor, a central processing unit (CPU), an auxiliary processor among several processors associated with the controller 700, a semiconductor-based microprocessor (in the form of a microchip or chip set), or generally any device for executing software instructions. When the controller 700 is in operation, the processor 702 is configured to execute software stored within memory, to communicate data to and from the memory, and to generally control operations of the controller 700 pursuant to the software instructions. The controller 700 can also include a network interface 704, a data store 706, memory 708, a network element interface 710, and the like, all of which are communicatively coupled therebetween and with the processor 702.

The network interface 704 can be used to enable the controller 700 to communicate on a network, such as to communicate control plane information to other controllers, to the management system 660, and the like. The network interface 704 can include, for example, an Ethernet card (e.g., 10BaseT, Fast Ethernet, Gigabit Ethernet) or a wireless local area network (WLAN) card (e.g., 802.11a/b/g). The network interface 704 can include address, control, and/or data connections to enable appropriate communications on the network. The data store 706 can be used to store data, such as control plane information, provisioning data, OAM&P data, etc. The data store 706 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 706 can incorporate electronic, magnetic, optical, and/or other types of storage media. The memory 708 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 708 may incorporate electronic, magnetic, optical, and/or other types of storage media. Note that the memory 708 can have a distributed architecture, where various components are situated remotely from one another, but may be accessed by the processor 702.

The network element interface 710 includes components for the controller 700 to communicate to other devices in a node, such as through the local interface 670. The components (702, 704, 706, 708, 710) are communicatively coupled via a local interface 714. The local interface 714 and the network element interface 710 can be, for example but not limited to, one or more buses or other wired or wireless connections, as is known in the art. The local interface 714 and the network element interface 710 can have additional elements, which are omitted for simplicity, such as controllers, buffers (caches), drivers, repeaters, and receivers, among many others, to enable communications. Further, the local interface 714 and the network element interface 710 can include address, control, and/or data connections to enable appropriate communications among the aforementioned components.

Figure 15:
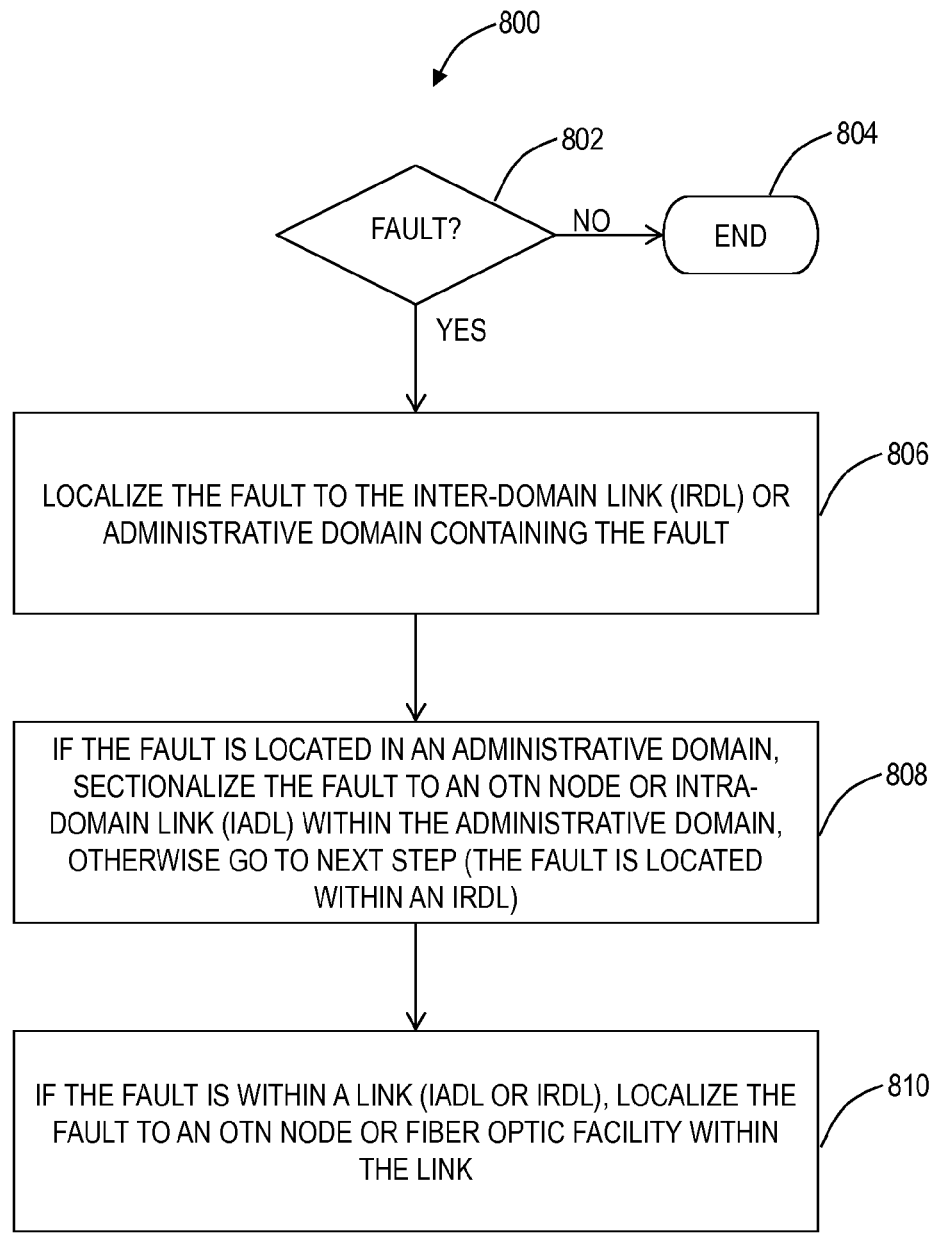
FIG. 15 is a flowchart of a fault localization method.

Referring to FIG. 15, in an exemplary embodiment, a flowchart illustrates a fault localization method 800. The fault localization method 800 contemplates operation on a network such as the network 400 via network elements such as the network elements 402, 600. As described herein, OTN provides arbitrary sub-network connection monitoring functions (Tandem Connection Monitors, TCMs); six TCM levels are available for assignment and configuration along each subnetwork connection. TCM levels may be nested; nested TCM levels may overwrite existing levels if not assigned and configured properly resulting in service disruption. Improper assignment and configuration of TCM levels for maintenance of in-service subnetwork connections may result in service disruption. Methods for the use of TCMs for fault localization of sub-network connections have not been defined. First, the fault localization method 800 assumes a defined structure for how TCM levels are assigned and configured for maintenance operations within an Administrative Domain such as the roles-based assignment scheme described herein. The fault localization method 800 provides a method for utilizing TCM for fault localization that can be performed manually or automatically within an Administrative Domain.

The fault localization method 800 determines whether or not there is a fault on a service (step 802). If not, the fault localization method 800 ends (step 804). If there is a fault, the fault localization method 800 localizes the fault to an Inter-Domain Link (IrDL) or Administrative Domain containing the fault (step 806). Specifically, reference is made back to the network 400 for the Inter-Domain Link (IrDL) 406 and the Administrative Domain 420, 422, 424. Each domain provides an end-to-end domain monitor using a specific TCM level assigned and configured at the time the end-to-end domain connection is created, such as based on the roles-based assignment scheme. Each IrDL provides a link monitor using a specific TCM level assigned and configured at the time the link connection is created, such as based on the roles-based assignment scheme. Fault and performance monitoring information provided by the existing link and end-to-end domain monitors identify the fault location as being either an IrDL or an Administrative Domain.

The fault localization method 800 determines if the fault is located in an Administrative Domain, and sectionalizes the fault to an OTN node or intra-domain link (IaDL) within the Administrative Domain (step 808), otherwise the fault localization method 800 goes to the next step (i.e., the fault is located within an IrDL). Using the same TCM level used for the end-to-end domain monitor, the fault localization method 800 can execute a fault localization process 850 described in FIG. 16. If the fault is determined to be within an IaDL then go the next step, otherwise stop (the fault is located within an OTN node and localization is complete, as determined by the fault localization process 850). If the fault is within a link (IaDL or IrDL), the fault localization method 800 localizes the fault to an OTN node or fiber optic facility within the link (step 810). Here, the fault localization method 800 can use the same TCM level as is used for the link monitor and execute a fault localization process 870 described in FIG. 17. If the fault is determined to be within a fiber optic facility or an OTN node stop (the fault localization is complete), otherwise no trouble is found.

In the fault localization method 800, the fault localization process 850, and the fault localization process 870, fault localization TCMs are configured with the source function set to Operational mode and the sink function set to Monitor mode. The fault localization TCM is used as follows. The Sink function operating in Monitor mode allows the TCM to operate like a non-intrusive monitor in the downstream direction. The Sink function operating in Monitor mode generates BEI and BDI information which is forwarded to the associated source function for insertion into the upstream direction. The Source function operating in Operational mode allows the TCM to source a new BIP-8, Trail Trace Identifier and status field (including the BEI and BDI information received from the associated sink function) in the upstream direction. The combination of fault localization TCM source and sink functions can be used to support intermediate monitoring points along an existing tandem connection (between tandem connection endpoints). The defect and performance information provided by the fault localization TCM can be accessed directly or, through the BDI and BEI functions, can be accessed by the upstream connection endpoint TCM (single ended monitoring from the tandem connection endpoints).

Fault localization TCMs can be inserted on the facility side of a node (analogous to a facility loopback when single ended monitoring is performed), or on the terminal side of a node (analogous to a terminal loopback when single ended monitoring is performed). By inserting a fault localization TCM at a point downstream of a link/connection endpoint, running fault and performance tests (monitor for defects and errors), then removing the fault localization TCM and sequentially repeating this process at points further and further downstream (these would include both facility and terminal monitoring points) a method for localizing link or equipment faults is provided (the location of the monitoring point at which the fault and/or performance test fails locates the faulted node or link). The insertion and removal of the TCM can be configured through management or control plane operations, and the tests can be performed manually or under application control.

Figure 16:
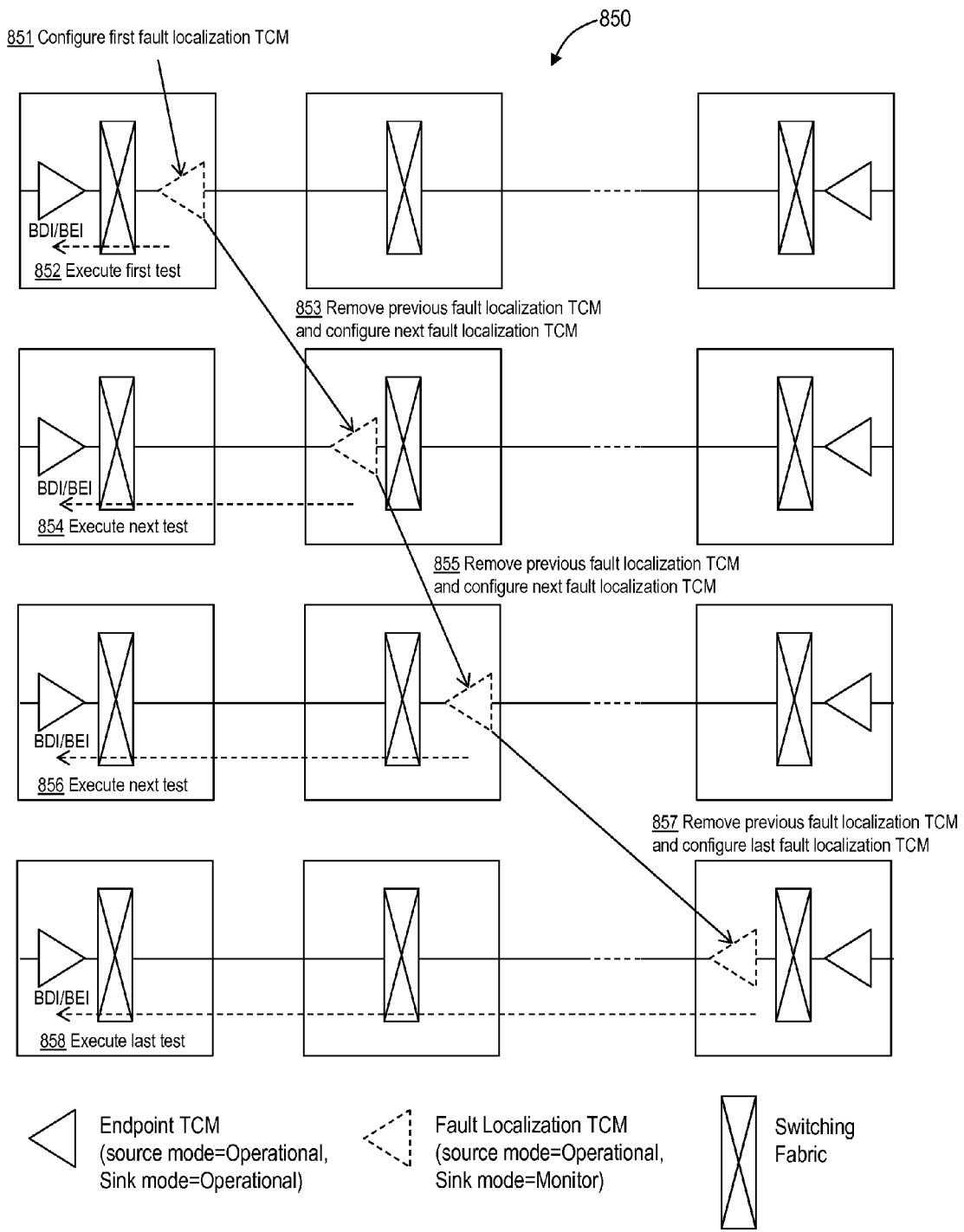
FIG. 16 is a network diagram of sequential steps of a fault localization process in an end-to-end domain connection case.

Referring to FIG. 16, in an exemplary embodiment, a network diagram illustrates sequential steps of the fault localization process 850 in an end-to-end domain connection case. The fault localization process 850 includes endpoint TCMs at the domain boundaries set in source mode equal to operational and sink mode equal to operational. First, the fault localization process 850 includes configuring a first fault localization TCM (step 851). This first fault localization TCM is configured next to a first switching fabric with an endpoint TCM on the other side of the switching fabric. The fault localization process 850 includes executing a first test (step 852). In this first test, the first fault localization TCM transmits BDI/BEI to the endpoint TCM on the other side of the switching fabric. Assuming the fault is not localized here to the first switching fabric; the fault localization process 850 removes the previous fault localization TCM and configures a next fault localization TCM at an opposing side of a link from its previous location.

Next, the fault localization process 850 executes a next test (step 854). Here, the next fault localization TCM at the opposing side of the link transmits BDI/BEI to the endpoint TCM on the other side of the switching fabric. Assuming the fault is not localized to the link; the fault localization process 850 removes the previous fault localization TCM and configures a next fault localization TCM at an opposing side of a next switching fabric from its previous location (step 855). The fault localization process 850 executes a next test (step 856). Here, the next fault localization TCM at the opposing side of the switching fabric transmits BDI/BEI to the endpoint TCM on the other side of the switching fabric and the link. Assuming the fault is not localized to the switching fabric; the fault localization process 850 continues by removing the previous fault localization TCM and configuring a last fault localization TCM on an opposing side of a switching fabric from the other endpoint TCM (step 857). The fault localization process 850 executes a last test (step 858). Here, the last fault localization TCM transmits BDI/BEI to the endpoint TCM.

In this manner, the fault localization process 850 enables a fault to be localized to a particular link or a particular switching fabric. For example, when the fault localization is located behind a switching fabric (relative to the beginning endpoint TCM), this is analogous to a terminal loopback. When the fault localization TCM is located in front of a switching fabric (relative to a link), this is analogous to a facility loopback. The fault localization process 850 can be repeated arbitrarily for any number of intermediate links and switching fabrics between the endpoint TCMs. The fault localization process 850 can end on each iteration of the test (BDI/BEI transmission) if there is a non-receipt thereby locally isolating the fault to the downstream link or switching fabric.

Figure 17:
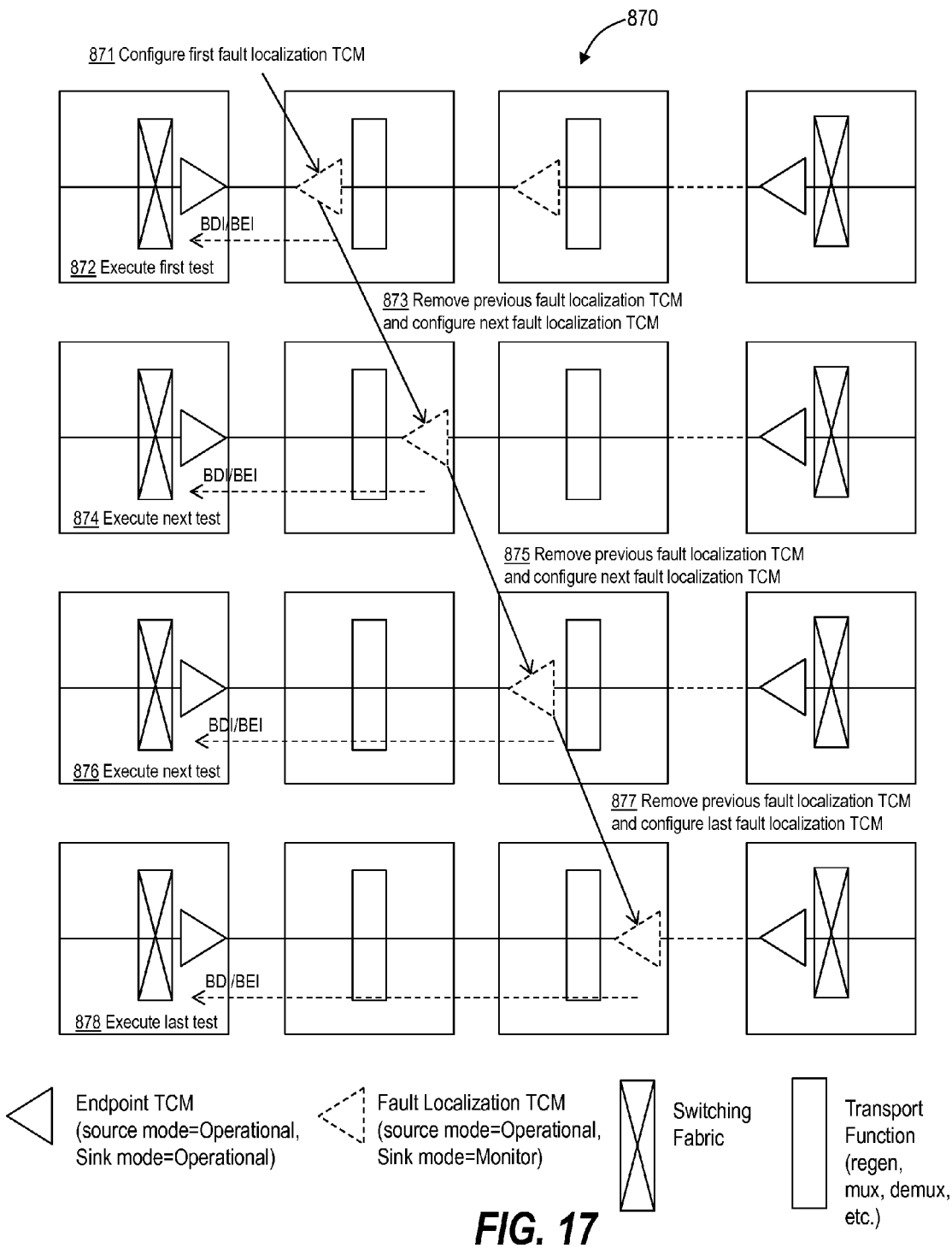
FIG. 17 is a network diagram of sequential steps of a fault localization process in an IxDL link case (x=a or r)

Referring to FIG. 17, in an exemplary embodiment, a network diagram illustrates sequential steps of the fault localization process 870 in an IxDL link case (x=a or r). The fault localization process 870 includes endpoint TCMs before switching fabrics set in source mode equal to operational and sink mode equal to operational. First, the fault localization process 870 includes configuring a first fault localization TCM (step 871). This first fault localization TCM is configured before a first transport function with an endpoint TCM on the other side of an associated link. The fault localization process 870 includes executing a first test (step 872). In this first test, the first fault localization TCM transmits BDI/BEI to the endpoint TCM on the other side of the link. Assuming the fault is not localized here to the link; the fault localization process 870 removes the previous fault localization TCM and configures a next fault localization TCM at an opposing side of a transport function from its previous location.

Next, the fault localization process 870 executes a next test (step 874). Here, the next fault localization TCM at the opposing side of the transport function transmits BDI/BEI to the endpoint TCM on the other side of the link and the transport function. Assuming the fault is not localized to the transport function; the fault localization process 870 removes the previous fault localization TCM and configures a next fault localization TCM at an opposing side of a next link from its previous location (step 875). The fault localization process 870 executes a next test (step 876). Here, the next fault localization TCM at the opposing side of the link transmits BDI/BEI to the endpoint TCM on the other side of the transport function and the links. Assuming the fault is not localized to the link; the fault localization process 870 continues by removing the previous fault localization TCM and configuring a last fault localization TCM on an opposing side of a transport function from the other endpoint TCM (step 877). The fault localization process 870 executes a last test (step 878). Here, the last fault localization TCM transmits BDI/BEI to the endpoint TCM.

Similar to the fault localization process 850, in this manner, the fault localization process 870 enables a fault to be localized to a particular link or a particular transport function. For example, when the fault localization is located behind a transport function (relative to the beginning endpoint TCM), this is analogous to a terminal loopback. When the fault localization TCM is located in front of a transport function (relative to a link), this is analogous to a facility loopback. The fault localization process 870 can be repeated arbitrarily for any number of intermediate links and transport functions between the endpoint TCMs. The fault localization process 870 can end on each iteration of the test (BDI/BEI transmission) if there is a non-receipt thereby locally isolating the fault to the downstream link or transport function.

Figure 18:
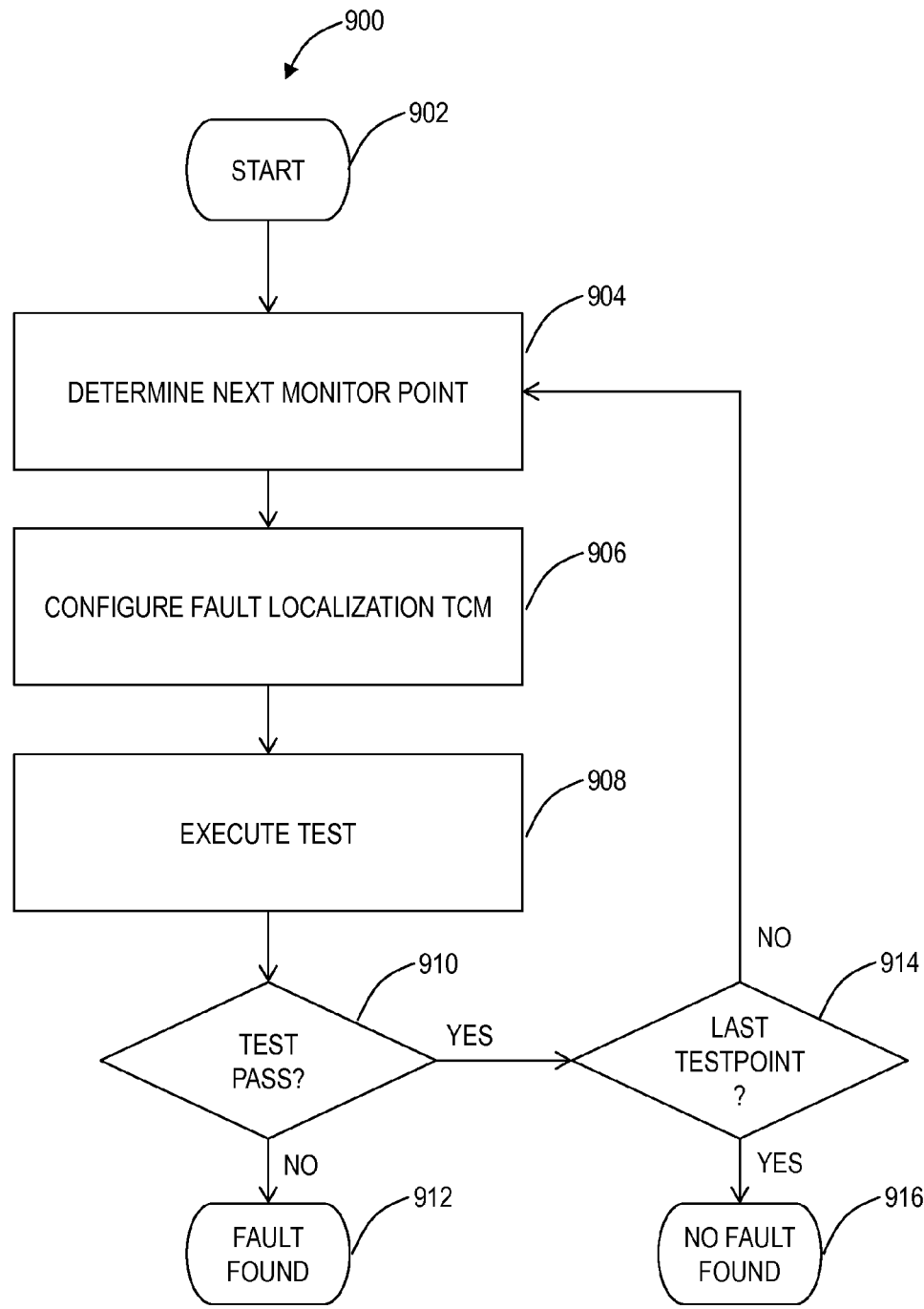
FIG. 18 is a flowchart of a generalized fault localization method using fault localization TCMs.

Referring to FIG. 18, in an exemplary embodiment, a flowchart illustrates a generalized fault localization method 900 using fault localization TCMs. The fault localization method 900 can be used with the network 400, the network elements 402, 600, etc. as a manual or automated method to localize OTN faults using TCMs. Further, the generalized fault localization method 900 can be a fully automated application utilizing control plane for fault localization TCM configuration, a partially automated application with some elements controlled by user input, or a fully manual application where a user manually executes each step of the process. The generalized fault localization method 900 starts (step 902). The start of the generalized fault localization method 900 may be automatically triggered by fault or error detection by endpoint TCMs, or could be triggered manually by user command. The generalized fault localization method 900 determines a next monitor point (step 904). This determination of next monitor point (including the identification of the last monitor point) may part of an automated application that includes information related to the connection route (control plane or management system information).

The generalized fault localization method 900 configures a fault localization TCM (step 906) at the determined next monitor point. This configuration of the Monitor TCM may be performed by control plane signaling or by management system or user command. The generalized fault localization method 900 executes a test (step 908). The test can include transmission downstream of BDI/BEI to the endpoint TCM. Test execution and results analysis may be executed by a management application or by manual user operations. If the test fails (step 910), the generalized fault localization method 900 has found its faults (step 912). Specifically, the fault location is based on the determined next monitor point. If the test succeeds, the generalized fault localization method 900 checks if it is the last test point (step 914). If it is the last test point, then the generalized fault localization method 900 has found no fault (step 916). If it is not the last test point, the generalized fault localization method 900 returns to step 904 and continues.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An Optical Transport Network (OTN) fault localization method, comprising:
   localizing a fault in a multi-domain OTN network to either an inter-domain link (IrDL) or an administrative domain in the multi-domain OTN network based on monitoring endpoint tandem connection monitors;
   responsive to the fault being in the administrative domain, localizing the fault within the administrative domain through a first iterative process with a first fault localization tandem connection monitor within the administrative domain; and responsive to the fault being in the inter-domain link (IrDL), localizing the fault to a network element or a link within the inter-domain link (IrDL) utilizing a second iterative process with a second fault localization tandem connection monitor within the inter-domain link, wherein tandem connection monitors are moved in the first iterative process and the second iterative process to isolate the fault to a specific location comprising one of a switching fabric, a transport function, and a link, and wherein the tandem connection monitors are moved between specific locations subsequent to passing a test which shows that the fault is not present at a given specific location.

2. The OTN fault localization method of claim 1, wherein the first iterative process and the second iterative process each comprise:

determining a next monitoring point;
configuring a fault localization tandem connection monitor at the determined next monitoring point;
executing a test between the fault localization tandem connection monitor and an associated endpoint tandem connection monitor;
if the test fails, determining a location of the fault based on a position of the fault localization tandem connection monitor; and
if the test succeeds and the fault localization tandem connection monitor is not at a last test point, repeating the determining, configuring, and executing steps.

3. The OTN fault localization method of claim 2, wherein the OTN fault localization method is implemented automatically by a control plane operating in the multi-domain OTN network or partially implemented by the control plane operating in the multi-domain OTN network along with portions controlled by user input.

4. The OTN fault localization method of claim 2, wherein the associated endpoint tandem connection monitor is set to an operational source mode and an operational sink mode, and wherein the fault localization tandem connection monitor is set to an operational source mode and a monitor sink mode.

5. The OTN fault localization method of claim 4, wherein the monitor source mode comprises a non-intrusive monitor in a downstream direction that generates Backward Defect Indication (BDI)/Backward Error Indication (BEI) that is forwarded to an associated source function for insertion in an upstream direction.

6. The OTN fault localization method of claim 2, wherein tandem connection monitors comprising the endpoint tandem connection monitors and the fault localization tandem connection monitor are assigned according to a roles-based scheme in the multi-domain OTN network.

7. The OTN fault localization method of claim 6, wherein the tandem connection monitors are automatically assigned according to the roles-based scheme by a control plane in the multi-domain OTN network upon creation of an associated service.

8. The OTN fault localization method of claim 1, wherein the first iterative process comprises:

configuring a first fault localization tandem connection monitor at an opposing side of a first switching fabric from an endpoint tandem connection monitor associated with the administrative domain;
executing a first test between the first fault localization tandem connection monitor and the endpoint tandem connection monitor;
if the first test fails, determining the first switching fabric is a location of the fault, else removing the first fault localization tandem connection monitor and configuring a second fault localization tandem connection monitor at an opposing side of a link from the first switching fabric;
executing a second test between the second fault localization tandem connection monitor and the endpoint tandem connection monitor; and
if the second test fails, determining the link is a location of the fault, else removing the second fault localization tandem connection monitor continue placing additional fault localization tandem connection monitors downstream until the location of the fault is found responsive to a failed test.

9. The OTN fault localization method of claim 1, wherein the second iterative process comprises:

configuring a first fault localization tandem connection monitor at an opposing side of a first link from an endpoint tandem connection monitor associated with the inter-domain link (IrDL);
executing a first test between the first fault localization tandem connection monitor and the endpoint tandem connection monitor;
if the first test fails, determining the first link is a location of the fault, else removing the first fault localization tandem connection monitor and configuring a second fault localization tandem connection monitor at an opposing side of transport function from the first link;
executing a second test between the second fault localization tandem connection monitor and the endpoint tandem connection monitor; and
if the second test fails, determining the transport function is a location of the fault, else removing the second fault localization tandem connection monitor continue placing additional fault localization tandem connection monitors downstream until the location of the fault is found responsive to a failed test.

10. An Optical Transport Network (OTN), comprising:

at least two administrative domains each comprising a plurality of OTN network elements interconnected therebetween via intra-domain (IaDL) links within the at least two administrative domains;
an inter-domain link (IrDL) interconnecting the at least two administrative domains;
a first set of endpoint tandem connection monitors within each of the at least two administrative domains;
a second set of endpoint tandem connection monitors on the inter-domain link (IrDL); and
a controller communicatively coupled to each of the plurality of OTN network elements, wherein the controller is configured to:
detect a fault;
localize the fault to either one of the at least two administrative domains or the inter-domain link (IrDL) based on monitoring the first set of endpoint tandem connection monitors and the second set of endpoint tandem connection monitors;
responsive to the fault being in one of the at least two administrative domains, localize the fault within the one of the at least two administrative domains through a first iterative process with a first fault localization tandem connection monitor within the one of the at least two administrative domains; and
responsive to the fault being in the inter-domain link (IrDL), localize the fault to a network element or a link within the inter-domain link (IrDL) utilizing a second iterative process with a second fault localization tandem connection monitor within the inter-domain link, wherein tandem connection monitors are moved in the first iterative process and the second iterative process to isolate the fault to a specific location comprising one of a switching fabric, a transport function, and a link, and wherein the tandem connection monitors are moved between specific locations subsequent to passing a test which shows that the fault is not present at a given specific location.

11. The OTN network of claim 10, wherein, for the first iterative process and the second iterative process, the controller is configured to:
- determine a next monitoring point;
- configure a fault localization tandem connection monitor at the determined next monitoring point;
- execute a test between the fault localization tandem connection monitor and an associated endpoint tandem connection monitor;
- if the test fails, determine a location of the fault based on a position of the fault localization tandem connection monitor; and
- if the test succeeds and the fault localization tandem connection monitor is not at a last test point, repeat the determine, configure, and execute steps.

12. The OTN network of claim 11, wherein tandem connection monitors comprising the endpoint tandem connection monitors and the fault localization tandem connection monitor are assigned according to a roles-based scheme in the multi-domain OTN network.

13. The OTN network of claim 10, wherein the controller is configured to implement a control plane, wherein the control plane is configured to isolate the fault.

14. The OTN network of claim 11, wherein the associated endpoint tandem connection monitor is set to an operational source mode and an operational sink mode, and wherein the fault localization tandem connection monitor is set to an operational source mode and a monitor sink mode.

15. The OTN network of claim 14, wherein the monitor source mode comprises a non-intrusive monitor in a downstream direction that generates Backward Defect Indication (BDI)/Backward Error Indication (BEI) that is forwarded to an associated source function for insertion in an upstream direction.

* * * * *